US012578447B2

(12) United States Patent　　(10) Patent No.:　US 12,578,447 B2
Seki et al.　　(45) Date of Patent:　Mar. 17, 2026

(54) RADAR DEVICE AND METHOD OF CONTROLLING RADAR DEVICE

(71) Applicant: KABUSHIKI KAISHA TOSHIBA, Tokyo (JP)

(72) Inventors: Takashi Seki, Yokohama Kanagawa (JP); Akira Moriya, Kawasaki Kanagawa (JP); Kazuhiro Tsujimura, Kawasaki Kanagawa (JP); Ryota Sekiya, Kamakura Kanagawa (JP); Hiroki Mori, Kawasaki Kanagawa (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 473 days.

(21) Appl. No.: 18/170,674

(22) Filed: Feb. 17, 2023

(65) Prior Publication Data

US 2024/0094370 A1　　Mar. 21, 2024

(30) Foreign Application Priority Data

Sep. 20, 2022　(JP) ................................. 2022-149591

(51) Int. Cl.
　G01S 13/34　　(2006.01)
　G01S 7/35　　(2006.01)
(52) U.S. Cl.
　CPC .............. G01S 13/34 (2013.01); G01S 7/354 (2013.01)
(58) Field of Classification Search
　CPC ........ G01S 13/003; G01S 13/34; G01S 13/87; G01S 13/887; G01S 13/89; G01S 7/354
　See application file for complete search history.

(56) References Cited

U.S. PATENT DOCUMENTS

| | | | | |
|---|---|---|---|---|
| 9,110,170 | B1 * | 8/2015 | Woollard | ................ G01S 13/89 |
| 11,355,860 | B2 | 6/2022 | Mori | |
| 2019/0064342 | A1 | 2/2019 | Daisy et al. | |
| 2020/0161775 | A1 | 5/2020 | Zhu et al. | |
| 2021/0199758 | A1 * | 7/2021 | Izadian | ................ G01S 13/931 |
| 2021/0278519 | A1 | 9/2021 | Mori | |
| 2022/0107407 | A1 | 4/2022 | Zhu et al. | |
| 2022/0146655 | A1 | 5/2022 | Asanuma et al. | |

(Continued)

FOREIGN PATENT DOCUMENTS

| | | |
|---|---|---|
| JP | 2019020212 A | 2/2019 |
| JP | 2023000084 A | 1/2023 |
| WO | 2022113294 A1 | 6/2022 |

OTHER PUBLICATIONS

"Imaging Radar Using Cascaded mmWave Sensor Reference Design", Texas Instruments, Design Guide: TIDEP-01012, Mar. 2020, 36 pages.

(Continued)

*Primary Examiner* — Timothy A Brainard
(74) *Attorney, Agent, or Firm* — Holtz, Holtz & Volek PC

(57)　　ABSTRACT

According to one embodiment, a radar device comprises a panel including clusters and a controller. The controller is configured to cause a first cluster of the clusters to transmit an electromagnetic wave to a target, cause the first cluster and at least one second cluster adjacent to the first cluster to receive a reflected wave from the target, and cause the first cluster and the at least one second cluster to output a reception signal. At least one cluster other than the first cluster and other than the at least one second cluster does not output the reception signal.

4 Claims, 23 Drawing Sheets

(56)     References Cited

U.S. PATENT DOCUMENTS

| 2022/0163658 | A1 |  | 5/2022 | Yoshioka et al. |
| 2022/0252720 | A1 | * | 8/2022 | Chung ................... G01S 13/52 |
| 2022/0404457 | A1 |  | 12/2022 | Mori et al. |
| 2023/0069118 | A1 |  | 3/2023 | Zhu et al. |

OTHER PUBLICATIONS

Japanese Office Action (and an English language translation thereof) dated Aug. 26, 2025, issued in counterpart Japanese Application No. 2022-149591.

* cited by examiner

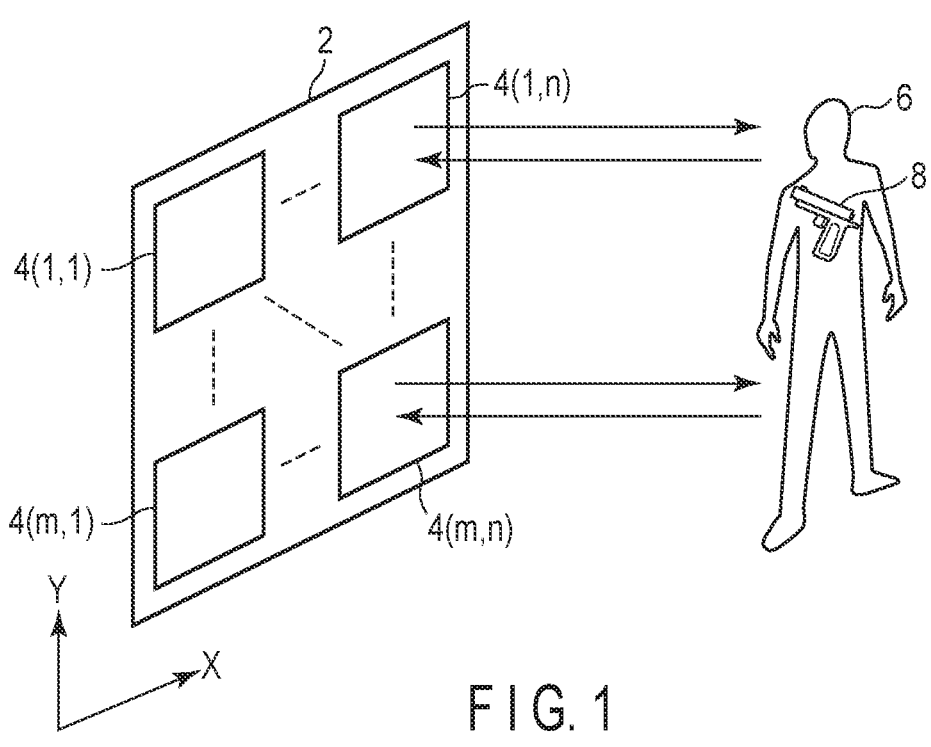
F I G. 1
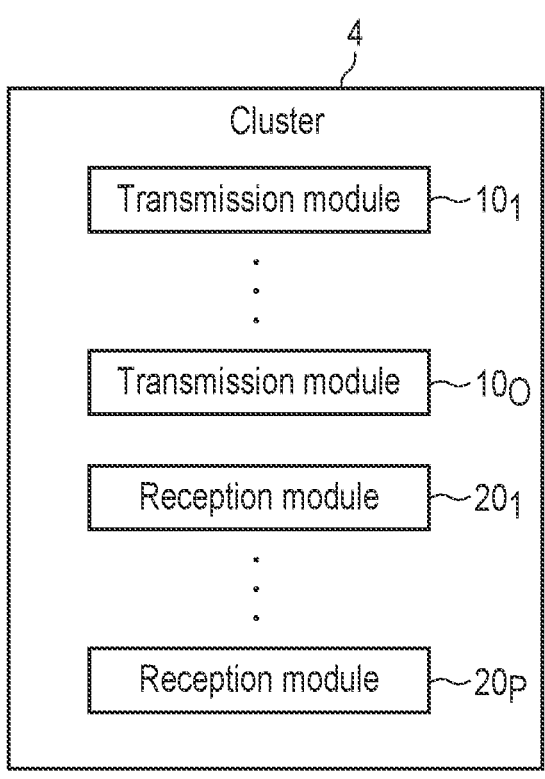
F I G. 2

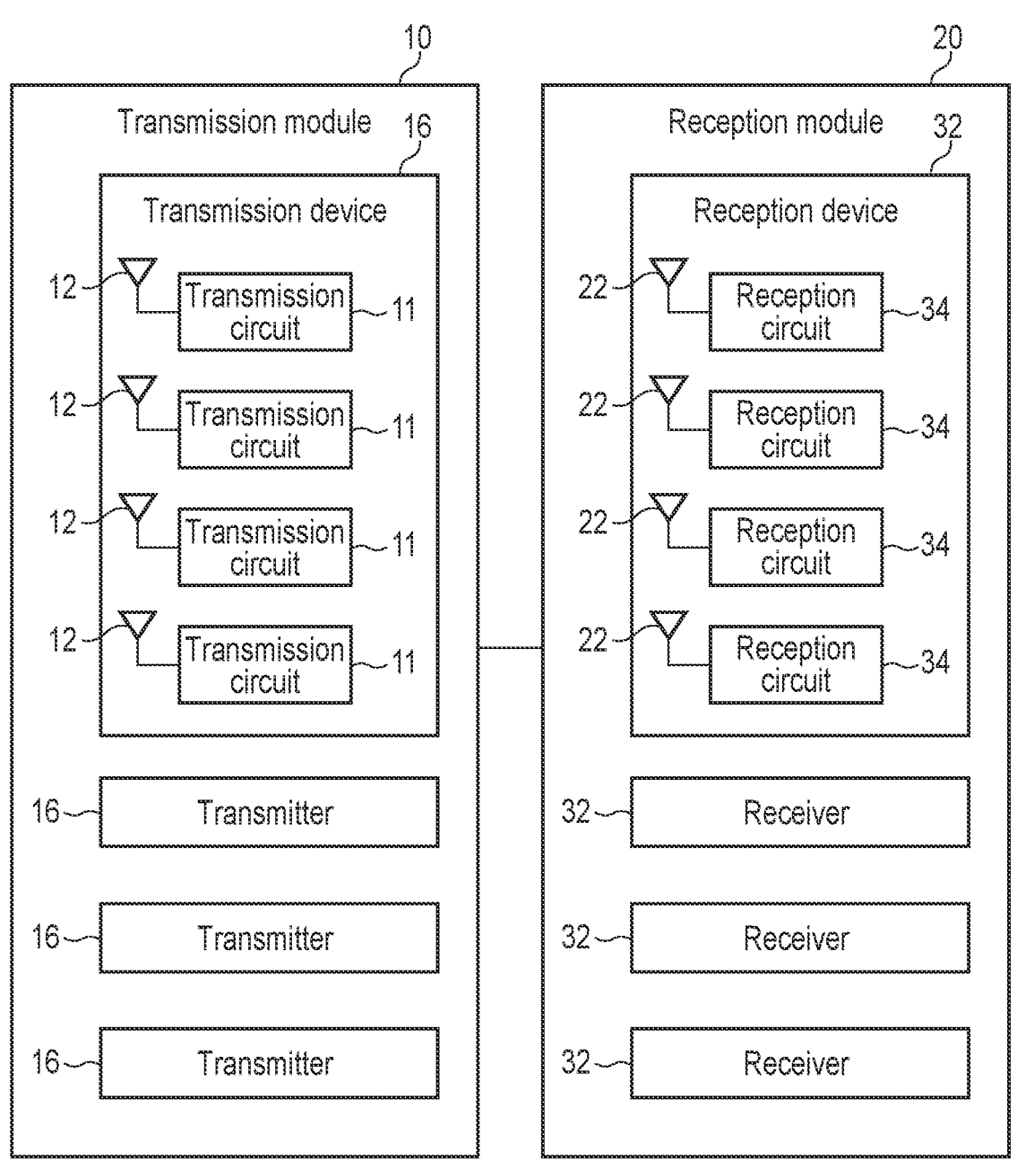
F I G. 4

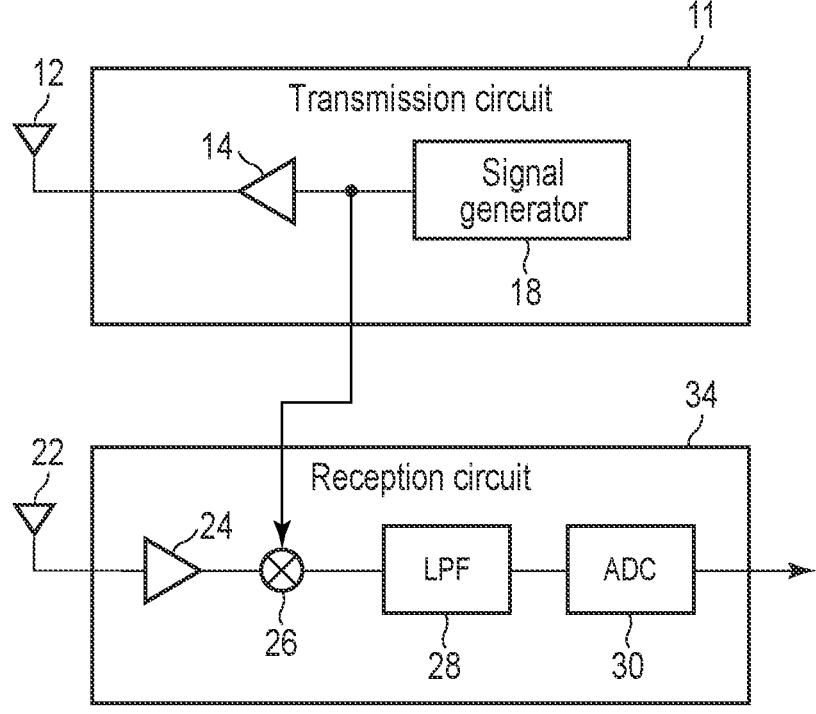
F I G. 5

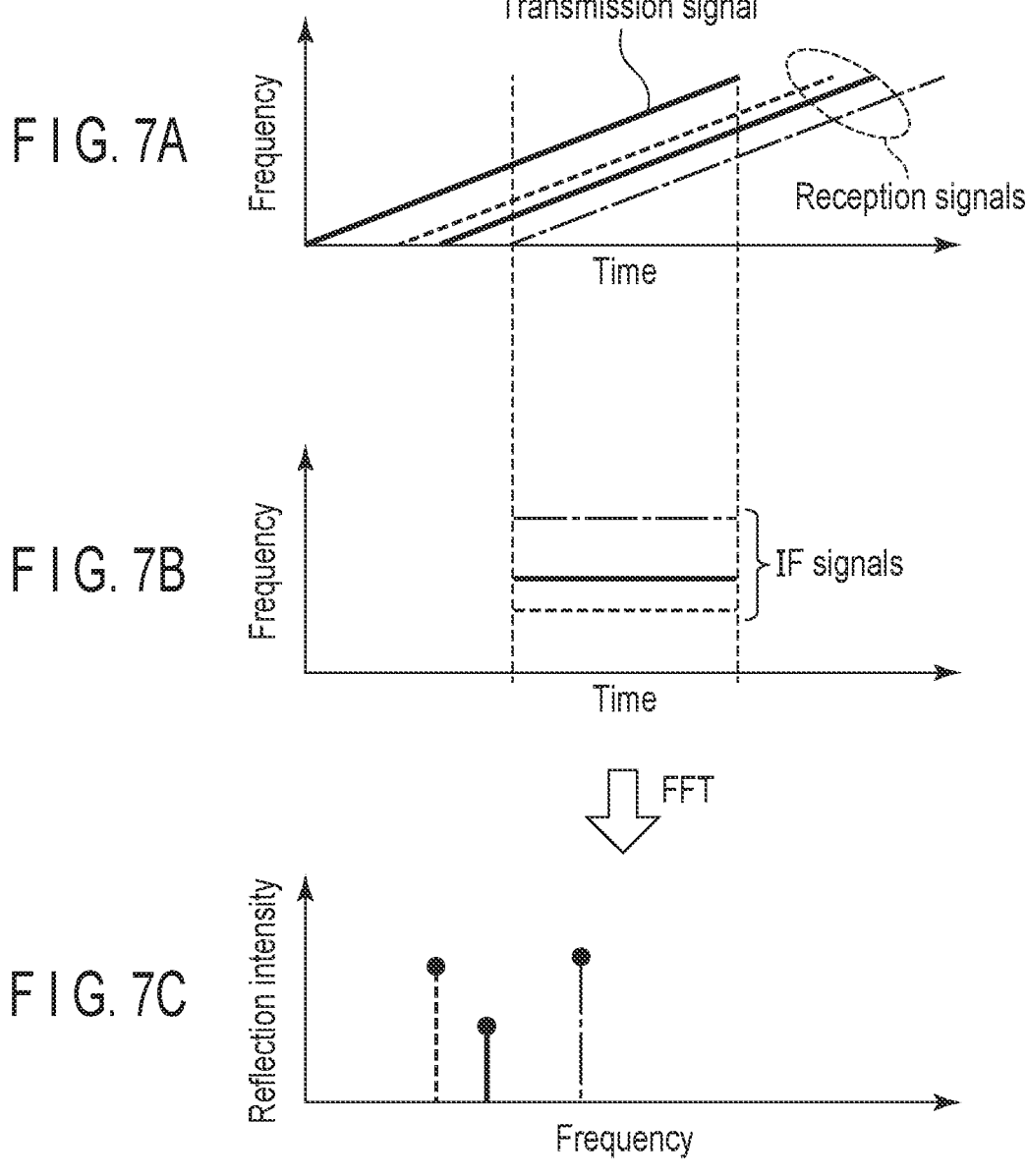
F I G. 7A
F I G. 7B
F I G. 7C

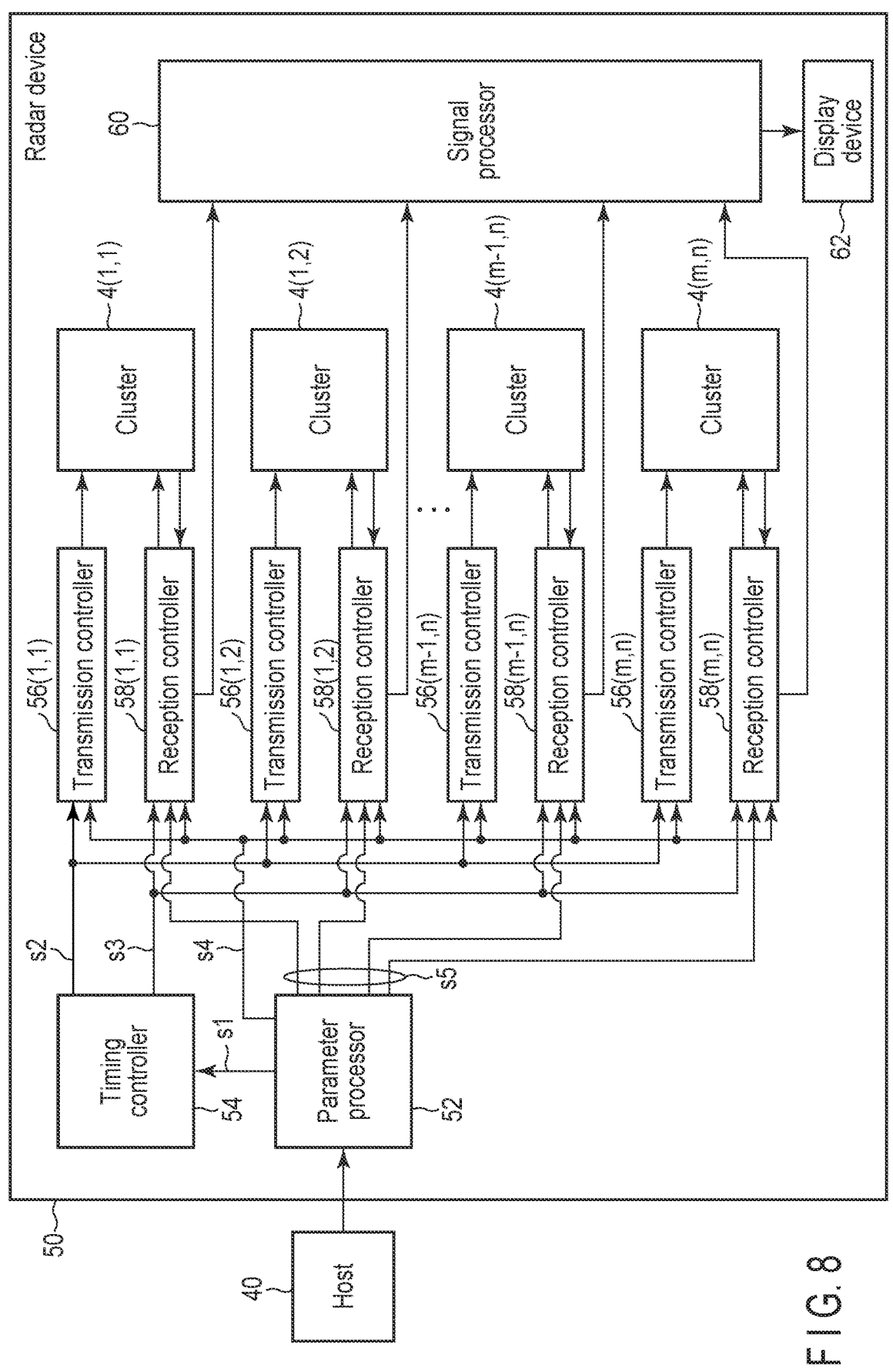
F I G. 8

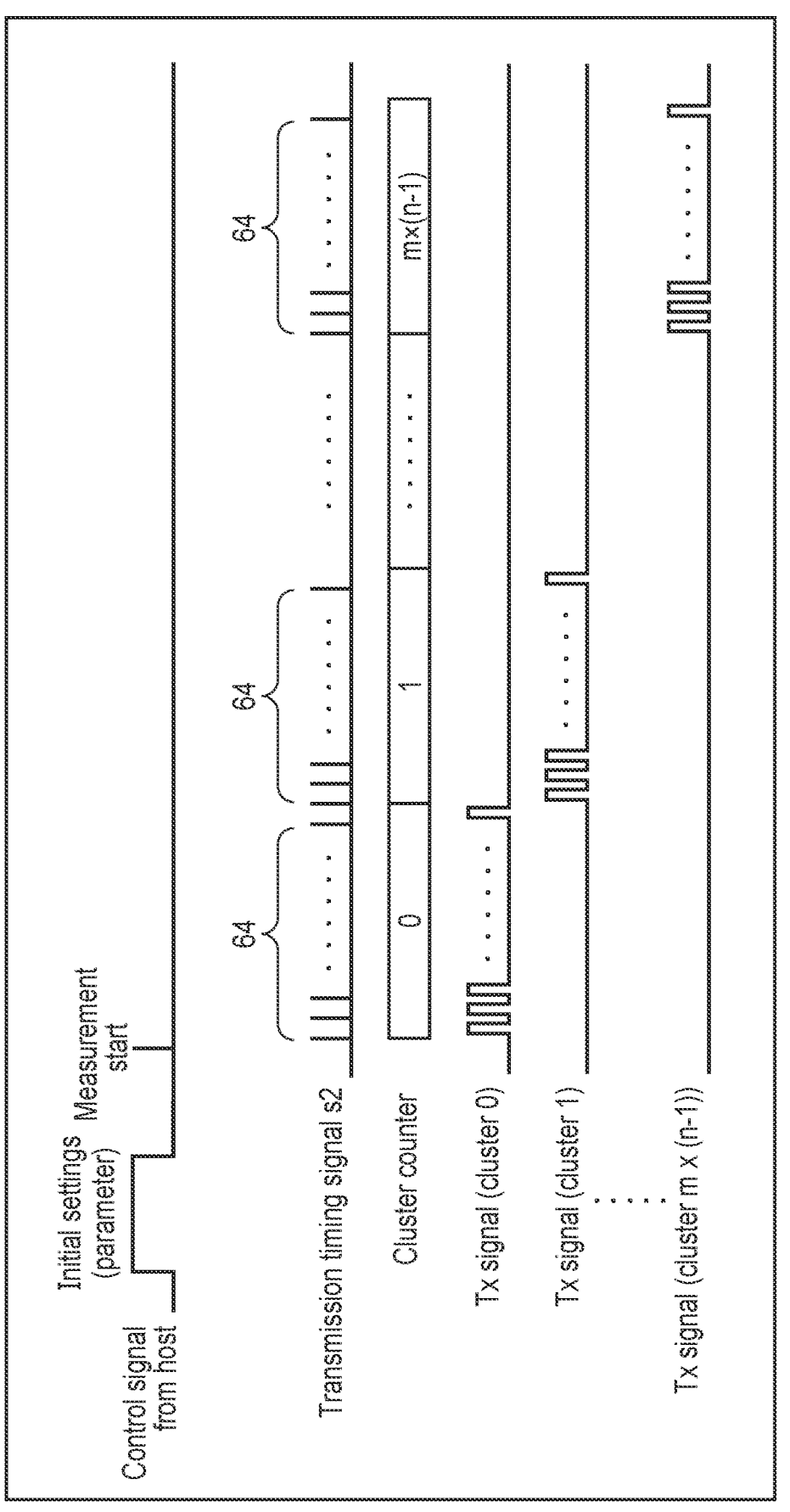
F I G. 9

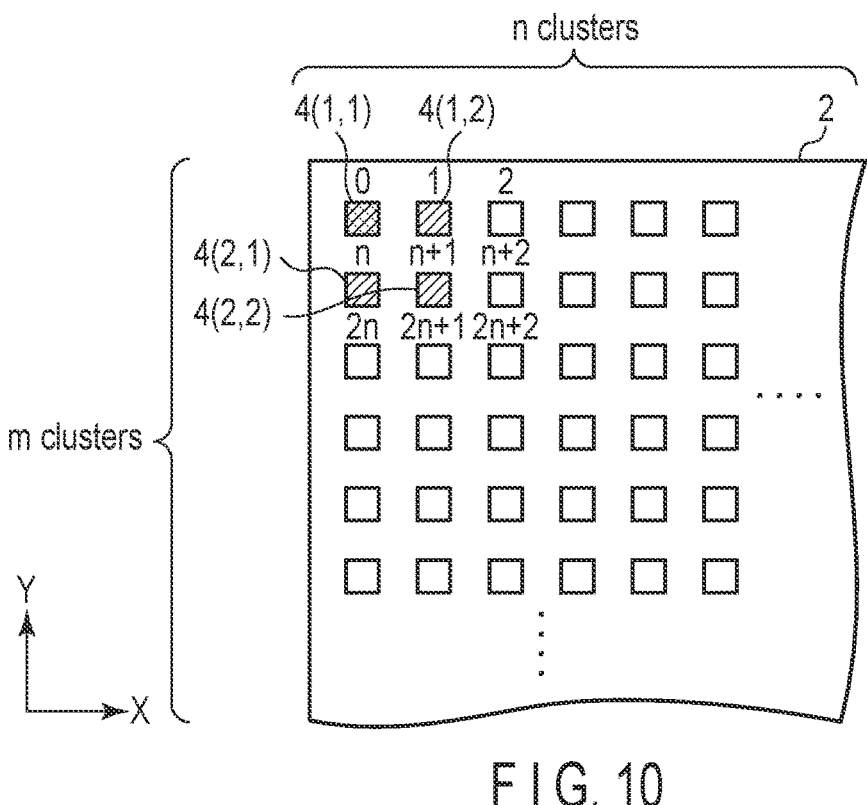
F I G. 10
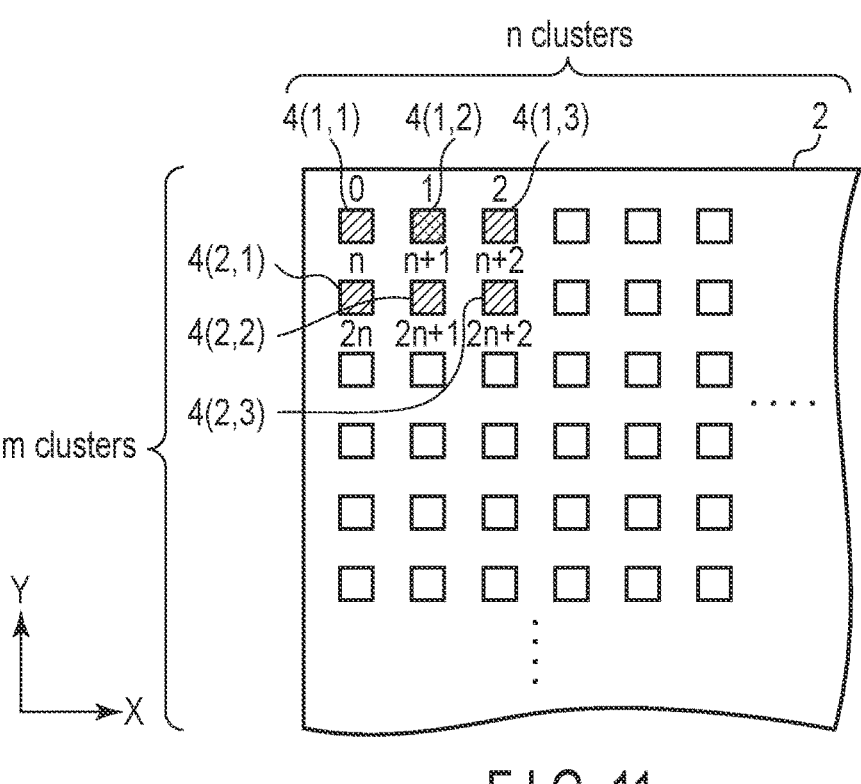
F I G. 11

| Cluster counter | 0 | 1 | 2 | ... | n | n+1 | n+2 | ... | 2n | 2n+1 | 2n+2 | ... |
|---|---|---|---|---|---|---|---|---|---|---|---|---|
| Transmission cluster | 4(1,1) | 4(1,2) | 4(1,3) | ... | 4(2,1) | 4(2,2) | 4(2,3) | ... | 4(3,1) | 4(3,2) | 4(3,3) | ... |
| Cluster 4(1,1) | Reception | Reception | | ... | Reception | Reception | | ... | | | | ... |
| Cluster 4(1,2) | Reception | Reception | Reception | ... | Reception | Reception | Reception | ... | | | | ... |
| Cluster 4(1,3) | | Reception | Reception | ... | | Reception | Reception | ... | | | | ... |
| Cluster 4(1,4) | | | Reception | ... | | | Reception | ... | | | | ... |
| ... | ... | ... | ... | ... | ... | ... | ... | ... | ... | ... | ... | ... |
| Cluster 4(2,1) | Reception | Reception | | ... | Reception | Reception | | ... | Reception | Reception | | ... |
| Cluster 4(2,2) | Reception | Reception | Reception | ... | Reception | Reception | Reception | ... | Reception | Reception | Reception | ... |
| Cluster 4(2,3) | | Reception | Reception | ... | | Reception | Reception | ... | | Reception | Reception | ... |
| Cluster 4(2,4) | | | Reception | ... | | | Reception | ... | | | Reception | ... |
| ... | ... | ... | ... | ... | ... | ... | ... | ... | ... | ... | ... | ... |
| Cluster 4(3,1) | | | | ... | Reception | Reception | | ... | Reception | Reception | | ... |
| Cluster 4(3,2) | | | | ... | Reception | Reception | Reception | ... | Reception | Reception | Reception | ... |
| Cluster 4(3,3) | | | | ... | | Reception | Reception | ... | | Reception | Reception | ... |
| Cluster 4(3,4) | | | | ... | | | Reception | ... | | | Reception | ... |
| ... | ... | ... | ... | ... | ... | ... | ... | ... | ... | ... | ... | ... |

F I G. 13

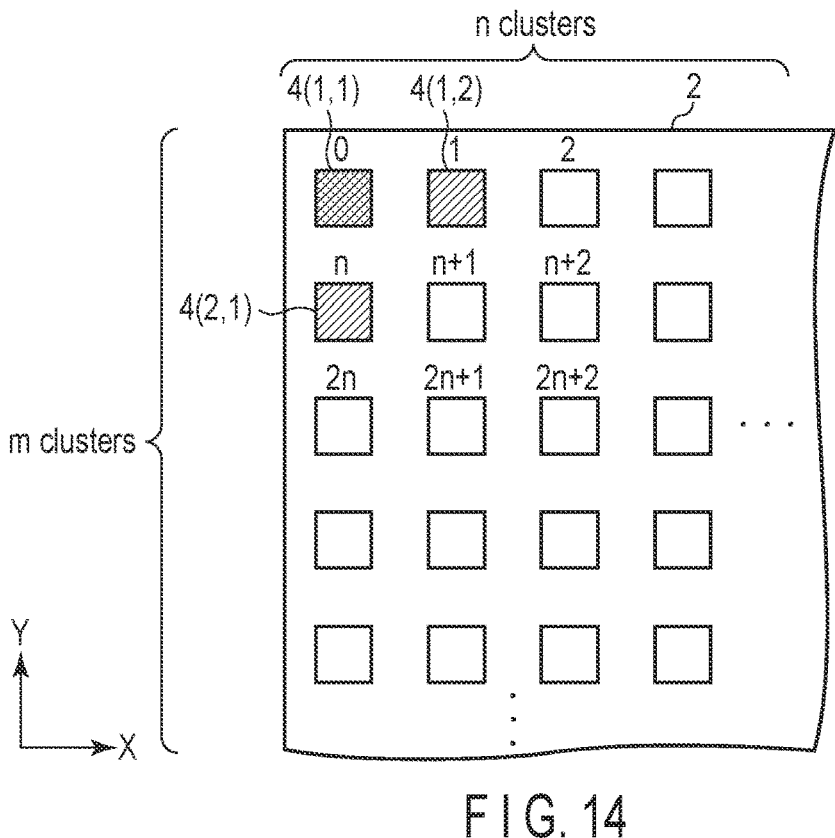
F I G. 14
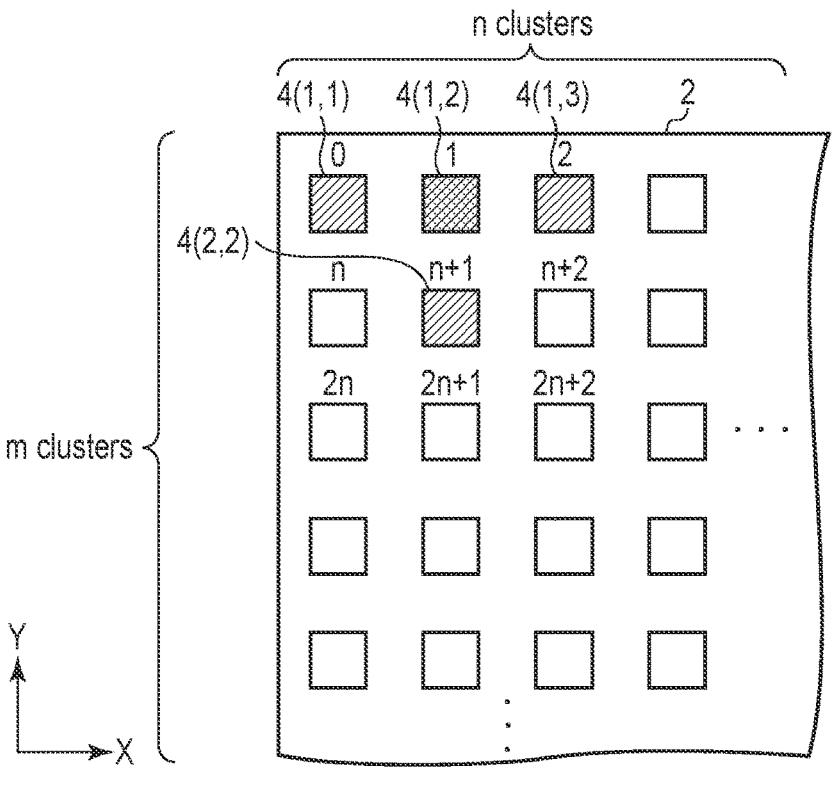
F I G. 15

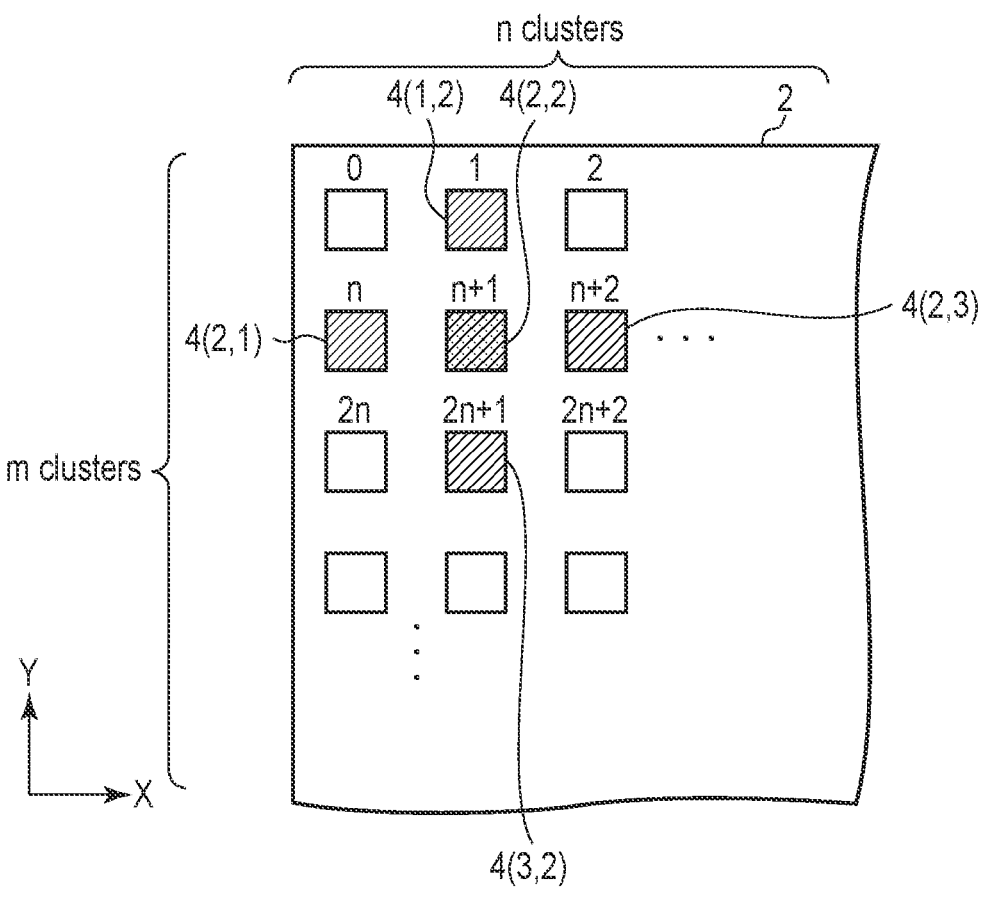
F I G. 16

| Cluster counter | 0 | 1 | 2 | ... | n | n+1 | n+2 | ... | 2n | 2n+1 | 2n+2 | ... |
|---|---|---|---|---|---|---|---|---|---|---|---|---|
| Transmission cluster | 4(1,1) | 4(1,2) | 4(1,3) | ... | 4(2,1) | 4(2,2) | 4(2,3) | ... | 4(3,1) | 4(3,2) | 4(3,3) | ... |
| Cluster 4(1,1) | Reception | Reception | | ... | Reception | | | ... | | | | ... |
| Cluster 4(1,2) | Reception | Reception | Reception | ... | | Reception | | ... | | | | ... |
| Cluster 4(1,3) | | Reception | Reception | ... | | | Reception | ... | | | | ... |
| Cluster 4(1,4) | | | Reception | ... | | | | ... | | | | ... |
| ... | ⋮ | ⋮ | ⋮ | ... | ⋮ | ⋮ | ⋮ | ... | ⋮ | ⋮ | ⋮ | ... |
| Cluster 4(2,1) | Reception | | | ... | Reception | Reception | | ... | Reception | | | ... |
| Cluster 4(2,2) | | Reception | | ... | Reception | Reception | Reception | ... | | Reception | | ... |
| Cluster 4(2,3) | | | Reception | ... | | Reception | Reception | ... | | | Reception | ... |
| Cluster 4(2,4) | | | | ... | | | Reception | ... | | | | ... |
| ... | ⋮ | ⋮ | ⋮ | ... | ⋮ | ⋮ | ⋮ | ... | ⋮ | ⋮ | ⋮ | ... |
| Cluster 4(3,1) | | | | ... | Reception | | | ... | Reception | Reception | | ... |
| Cluster 4(3,2) | | | | ... | | Reception | | ... | Reception | Reception | Reception | ... |
| Cluster 4(3,3) | | | | ... | | | Reception | ... | | Reception | Reception | ... |
| Cluster 4(3,4) | | | | ... | | | | ... | | | Reception | ... |
| ... | ⋮ | ⋮ | ⋮ | ... | ⋮ | ⋮ | ⋮ | ... | ⋮ | ⋮ | ⋮ | ... |

F I G. 17

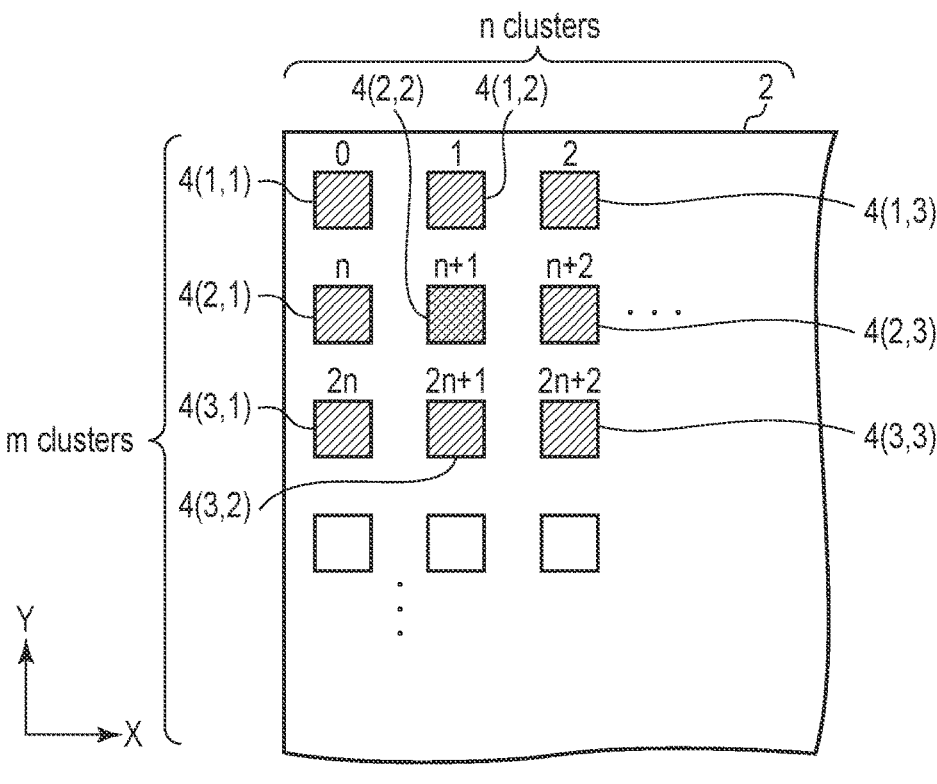
F I G. 20
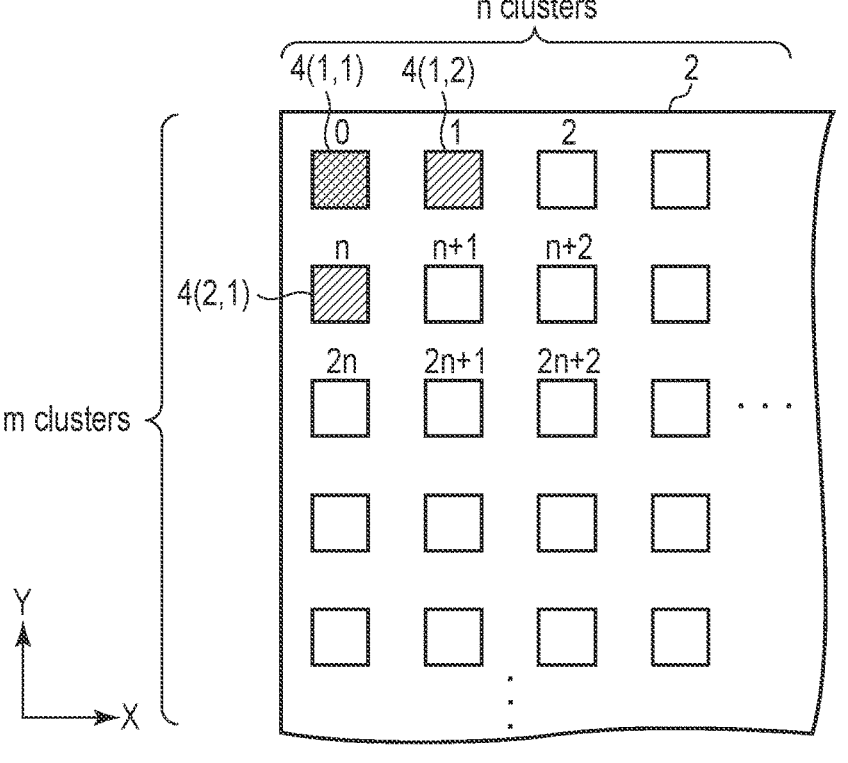
F I G. 21

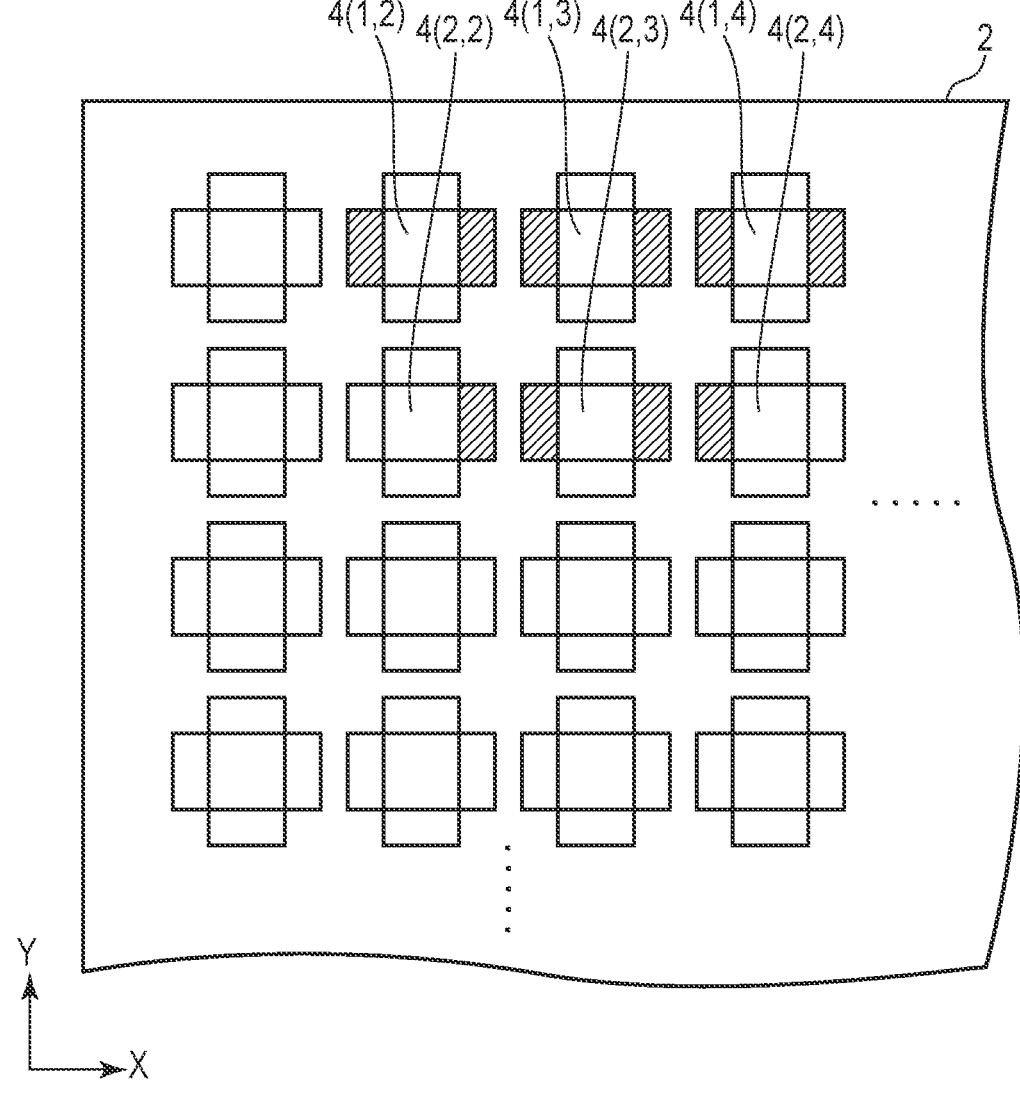
F I G. 25

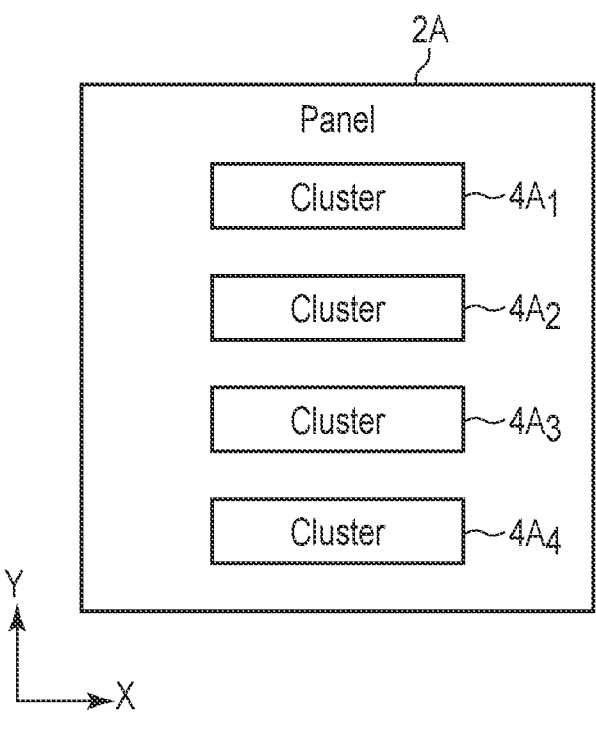
F I G. 27
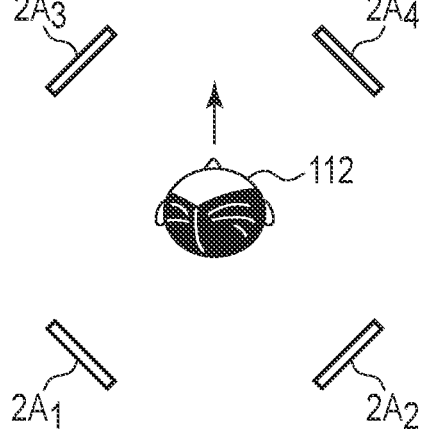
F I G. 28

F I G. 30A

| | Cluster counter | 0 | 1 | 2 | 3 | 4 | 5 | 6 | 7 |
|---|---|---|---|---|---|---|---|---|---|
| Panel 2A1 | Transmission cluster | 4A1 | 4A2 | 4A3 | 4A4 | | | | |
| Panel 2A1 | Reception cluster | 4A1~4 | 4A1~4 | 4A1~4 | 4A1~4 | 4A1~4 | 4A1~4 | 4A1~4 | 4A1~4 |
| Panel 2A2 | Transmission cluster | | | | | 4A1 | 4A2 | 4A3 | 4A4 |
| Panel 2A2 | Reception cluster | 4A1~4 | 4A1~4 | 4A1~4 | 4A1~4 | 4A1~4 | 4A1~4 | 4A1~4 | 4A1~4 |
| Panel 2A3 | Transmission cluster | | | | | | | | |
| Panel 2A3 | Reception cluster | | | | | | | | |
| Panel 2A4 | Transmission cluster | | | | | | | | |
| Panel 2A4 | Reception cluster | | | | | | | | |

F I G. 30B

| | Cluster counter | 8 | 9 | 10 | 11 | 12 | 13 | 14 | 15 |
|---|---|---|---|---|---|---|---|---|---|
| Panel 2A1 | Transmission cluster | | | | | | | | |
| Panel 2A1 | Reception cluster | | | | | | | | |
| Panel 2A2 | Transmission cluster | | | | | | | | |
| Panel 2A2 | Reception cluster | | | | | | | | |
| Panel 2A3 | Transmission cluster | 4A1 | 4A2 | 4A3 | 4A4 | | | | |
| Panel 2A3 | Reception cluster | 4A1~4 | 4A1~4 | 4A1~4 | 4A1~4 | 4A1~4 | 4A1~4 | 4A1~4 | 4A1~4 |
| Panel 2A4 | Transmission cluster | | | | | 4A1 | 4A2 | 4A3 | 4A4 |
| Panel 2A4 | Reception cluster | 4A1~4 | 4A1~4 | 4A1~4 | 4A1~4 | 4A1~4 | 4A1~4 | 4A1~4 | 4A1~4 |

RADAR DEVICE AND METHOD OF CONTROLLING RADAR DEVICE

CROSS-REFERENCE TO RELATED APPLICATIONS

This application is based upon and claims the benefit of priority from Japanese Patent Application No. 2022-149591, filed Sep. 20, 2022, the entire contents of which are incorporated herein by reference.

FIELD

Embodiments described herein relate generally to a radar device and a method of controlling the radar device.

BACKGROUND

It has been expected that radar devices will be applied to inspections in various fields of automobiles, non-destructive testing, medical treatment, security, etc. The accuracy of inspection is proportional to the number of antennas which transmit and receive radar electromagnetic waves. As the number of antennas increases, the size of a reception signal also increases. The processing time to process the reception signal and obtain the inspection result also increases, as the number of antennas increases. If inspections are conducted in cycles, the processing time of the reception signal needs to be made shorter than the cycles.

BRIEF DESCRIPTION OF THE DRAWINGS

FIG. 1 is a diagram for explaining an example of a radar device according to a first embodiment.

FIG. 2 is a diagram for explaining an example of a cluster according to the first embodiment.

FIG. 4 is a block diagram for explaining an example of the configurations of the transmission module and the reception module according to the first embodiment.

FIG. 5 is a block diagram for explaining an example of the configurations of a transmission circuit and a reception circuit according to the first embodiment.

FIG. 7A illustrates an example for explaining the operation of the radar device according to the first embodiment.

FIG. 7B illustrates the example for explaining the operation of the radar device according to the first embodiment.

FIG. 7C illustrates the example for explaining the operation of the radar device according to the first embodiment.

FIG. 8 is a block diagram for explaining an example of the configuration of the radar device according to the first embodiment.

FIG. 9 is a timing chart for explaining an example of the transmission operation of the radar device according to the first embodiment.

FIG. 10 is a diagram for explaining a first operation example of the radar device according to the first embodiment.

FIG. 11 is a diagram for explaining the first operation example of the radar device according to the first embodiment.

FIG. 13 is a diagram for explaining the first operation example of the radar device according to the first embodiment.

FIG. 14 is a diagram for explaining the first operation example of the radar device according to the first embodiment.

FIG. 15 is a diagram for explaining the first operation example of the radar device according to the first embodiment.

FIG. 16 is a diagram for explaining the first operation example of the radar device according to the first embodiment.

FIG. 17 is a diagram for explaining the first operation example of the radar device according to the first embodiment.

FIG. 20 is a diagram for explaining the second operation example of the radar device according to the first embodiment.

FIG. 21 is a diagram for explaining the second operation example of the radar device according to the first embodiment.

FIG. 25 is a diagram for explaining the third operation example of the radar device according to the first embodiment.

FIG. 27 is a diagram for explaining an example of a panel of a radar device according to a second embodiment.

FIG. 28 is a diagram for explaining an example of the arrangement of panels of the radar device according to the second embodiment.

FIG. 30A is a diagram for explaining an example of a transmission timing and a reception timing of the radar device according to the second embodiment.

FIG. 30B is a diagram for explaining an example of a transmission timing and a reception timing of the radar device according to the second embodiment.

DETAILED DESCRIPTION

Figure 3:
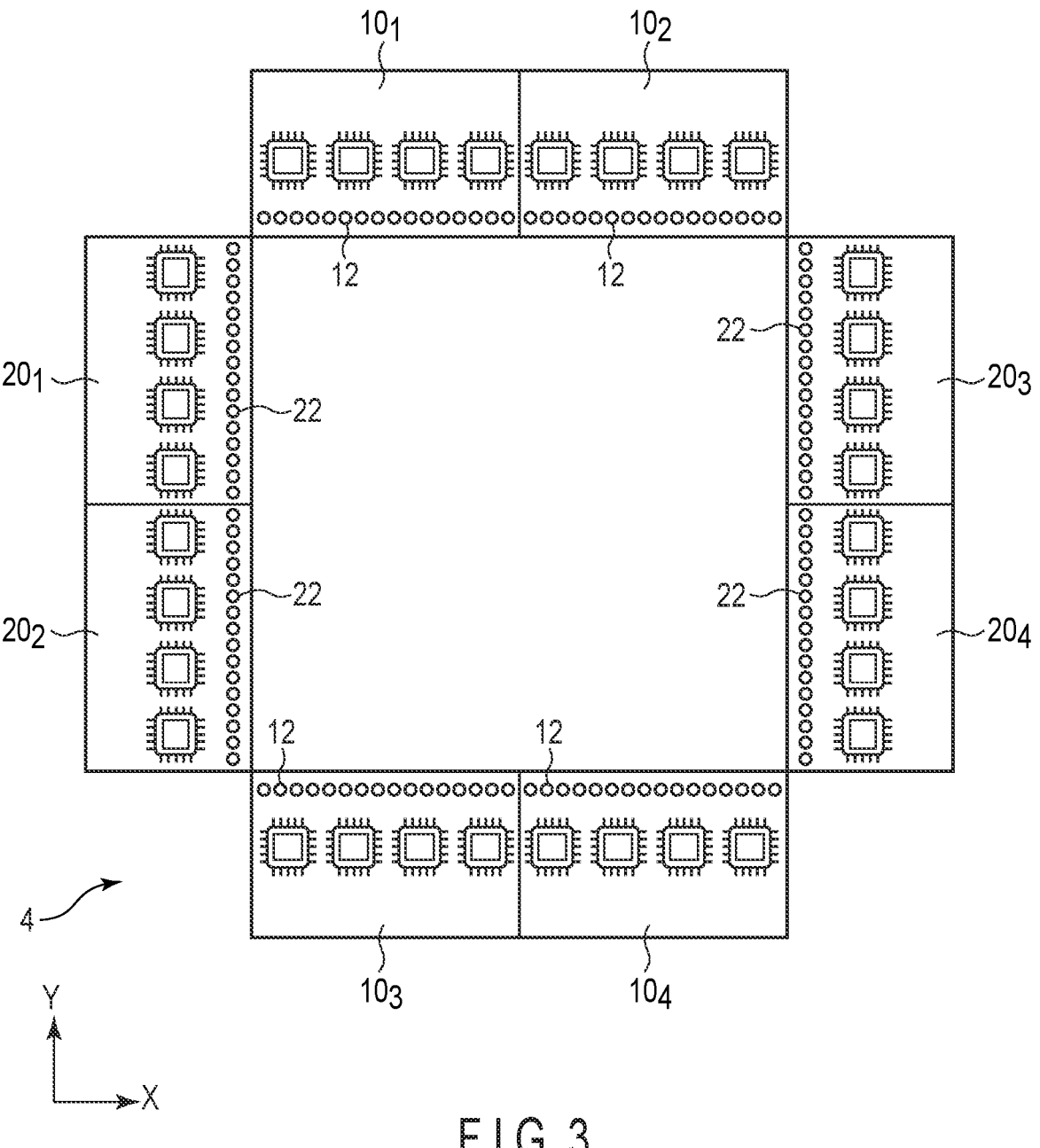
FIG. 3 is a diagram for explaining an example of the arrangement of transmission modules and reception modules according to the first embodiment.

Various embodiments will be described hereinafter with reference to the accompanying drawings.

The disclosure is merely an example and is not limited by contents described in the embodiments described below. Modification which is easily conceivable by a person of ordinary skill in the art comes within the scope of the disclosure as a matter of course. In order to make the description clearer, the sizes, shapes, and the like of the respective parts may be changed and illustrated schematically in the drawings as compared with those in an accurate representation. Constituent elements corresponding to each other in a plurality of drawings are denoted by like reference numerals and their detailed descriptions may be omitted unless necessary.

In general, according to one embodiment, a radar device comprises a panel including clusters and a controller. The controller is configured to cause a first cluster of the clusters to transmit an electromagnetic wave to a target, cause the first cluster and at least one second cluster adjacent to the first cluster to receive a reflected wave from the target, and cause the first cluster and the at least one second cluster to output a reception signal. At least one cluster other than the first cluster and other than the at least one second cluster does not output the reception signal.

First Embodiment

FIG. 1 is a diagram for explaining an example of a radar device according to a first embodiment. The radar device comprises a panel 2 which transmits an electromagnetic wave to an inspection target 6 and receives a reflected electromagnetic wave from the inspection target 6. The radar device inspects an item 8 carried by the inspection target 6. When inspected, the inspection target 6 stands still in front of the panel 2. A radar device applied to the field of security detects whether the inspection target 6 carries the item 8 such as a dangerous object which is not permitted to be carried. Examples of the dangerous object include a gun, a knife, an explosive, etc.

FIG. 1 illustrates an example of the panel 2 in the form of a rectangular plane. The panel 2 includes at least one cluster 4. The cluster 4 is a unit of transmission and reception of an electromagnetic wave. One cluster 4 operates as a transmission cluster. At least one cluster 4 operates as a reception cluster. After an electromagnetic wave is transmitted from the transmission cluster, another cluster operates as the transmission cluster. In this manner, an electromagnetic wave is transmitted in order from each cluster 4. At least one reception cluster 4 receives a reflected wave. When the size of the cluster 4 is smaller than that of the inspection target 6, the panel 2 includes a plurality of clusters 4 so that an electromagnetic wave can be transmitted to the whole inspection target 6 and a reflected wave from the whole inspection target 6 can be received. The clusters 4 are arranged in a two-dimensional array with m rows and n columns.

In the first row, n clusters $4(1, 1)$ to $4(1, n)$ are arranged in an X direction. Similarly, in the mth row, n clusters $4(m, 1)$ to $4(m, n)$ are arranged in the X direction. In the first column, m clusters $4(1, 1)$ to $4(m, 1)$ are arranged in a Y direction. Similarly, in the nth column, m clusters $4(1, n)$ to $4(m, n)$ are arranged in the Y direction.

FIG. 2 is a diagram for explaining an example of the cluster 4 according to the first embodiment. The cluster 4 includes at least one transmission module and at least one reception module 20. FIG. 2 shows the cluster 4 including o transmission modules $10_1$ to $10_o$ and p reception modules $20_1$ to $20_p$. Here, o and p may be equal to each other or may be different from each other.

FIG. 3 illustrates an example of the arrangement of the transmission module 10 and the reception module 20 in the cluster 4 according to the first embodiment. The shapes of the transmission module 10 and the reception module 20 are rectangles. The transmission module 10 includes transmission antennas 12. The transmission antennas 12 constitute an array antenna. The reception module 20 includes reception antennas 22. The reception antennas 22 constitute an array antenna. An example of the array antenna includes a one-dimensional array (linear array) antenna and a two-dimensional array (planar array) antenna. In the example of FIG. 3, both the transmission antennas 12 and the reception antennas 22 are the one-dimensional array antenna.

FIG. 3 illustrates an example in which the cluster 4 includes four transmission modules $10_1$ to $10_4$ and four reception modules $20_1$ to $20_4$ for the convenience of explanation. The two transmission modules $10_1$ and $10_2$ are arranged along one side extending in the X direction of a square area. The two transmission modules $10_3$ and $10_4$ are arranged along the other side extending in the X direction of the square area. Therefore, the transmission antennas 12 are arranged in the X direction around the periphery of the square area. The two reception modules $20_1$ and $20_2$ are arranged along one side extending in the Y direction of the square area. The two reception modules $20_3$ and $20_4$ are arranged along the other side extending in the Y direction of the square area. Therefore, the reception antennas 22 are arranged in the Y direction around the periphery of the square area. The viewing angles of all the transmission antennas 12 are equal to each other. The viewing angles of all the reception antennas 22 are equal to each other. The viewing angles of all the transmission antennas 12 and all the reception antennas 22 are equal to each other.

Because transmission and reception are interchangeable, an arrangements other than the example of FIG. 3 is possible. The reception modules $20_1$ to $20_4$ may be arranged to be adjacent to each other in the X direction such that the reception array antenna is arranged in the X direction. The transmission modules $10_1$ to $10_4$ may be arranged to be adjacent to each other in the Y direction such that the transmission array antenna is arranged in the Y direction.

The pair of transmission modules $10_1$ and $10_2$, and the pair of transmission modules $10_3$ and $10_4$ are separated from each other in the Y direction. The distance in the Y direction between the pair of transmission modules $10_1$, $10_2$ and the pair of transmission modules $10_3$, $10_4$ is the length in the Y direction of the pair of reception modules $20_1$ and $20_2$ (or reception modules $20_3$ and $20_4$). The pair of reception modules $20_1$, $20_2$ and the pair of reception modules $20_3$, $20_4$ are separated from each other in the X direction. The distance in the X direction between the pair of reception modules $20_1$, $20_2$ and the pair of reception modules $20_3$, $20_4$ is the length in the X direction of the pair of transmission modules $10_1$ and $10_2$ (or transmission modules $10_3$ and $10_4$). The length in the Y direction of the pair of reception modules $20_1$ and $20_2$ (or reception modules $20_3$ and $20_4$) is equal to the interval in the Y direction between two clusters 4 adjacent to each other in the Y direction of the panel 2. The length in the X direction of the pair of transmission modules $10_1$ and $10_2$ (or transmission modules $10_3$ and $10_4$) is equal to the interval in the X direction between two clusters 4 adjacent to each other in the X direction of the panel 2.

FIG. 4 is a block diagram for explaining an example of the configurations of the transmission module 10 and the reception module 20 according to the first embodiment. The transmission module 10 comprises (for example, four) transmission devices 16. Each of the transmission devices 16 comprises (for example, four) transmission circuits 11. To each of the transmission circuits 11, at least one transmission antenna 12 is connected. The viewing angles of all the transmission antennas 122 are equal to each other. The transmission circuits 11 may be composed of an integrated circuit. The reception module 20 comprises (for example, four) reception devices 32. Each of the reception devices 32 comprises (for example, four) reception circuits 34. To each of the reception circuits 34, at least one reception antenna 22 is connected. The reception module 34 may be composed of an integrated circuit. The viewing angles of all the reception antennas 22 are equal to each other.

FIG. 5 is a diagram for explaining an example of the configurations of the transmission circuits 11 and the reception circuits 34 according to the first embodiment. Each of the transmission circuits 11 comprises a signal generator 18 and an amplifier 14. The signal generator 18 generates a linear frequency modulated continuous wave (L-FMCW) signal whose frequency increases linearly with the passage of time. In this specification, the L-FMCW signal is referred to as a chirp signal.

The signal generator 18 transmits a chirp signal to the transmission antenna 12 via the amplifier 14. A chirp signal (electromagnetic wave) is transmitted from the transmission antenna 12.

Each of the reception circuits 34 comprises an amplifier 24, a mixer 26, a low-pass filter (LPF) 28, and an A/D converter (ADC) 30.

The reception antenna 22 is connected to the amplifier 24. An output signal of the amplifier 24 is input to a first input terminal of the mixer 26. A chirp signal generated by the signal generator 18 is input to a second input terminal of the mixer 26. The mixer 26 multiplies a reception signal of the antenna 22 and the chirp signal together. The mixer 26 generates an intermediate frequency (IF) signal.

The IF signal output by the mixer 26 is input to a signal processor via the LPF 28 and the ADC 30. The signal processor generate an image signal by processing the reception signals of the antennas 22.

Figure 6A:
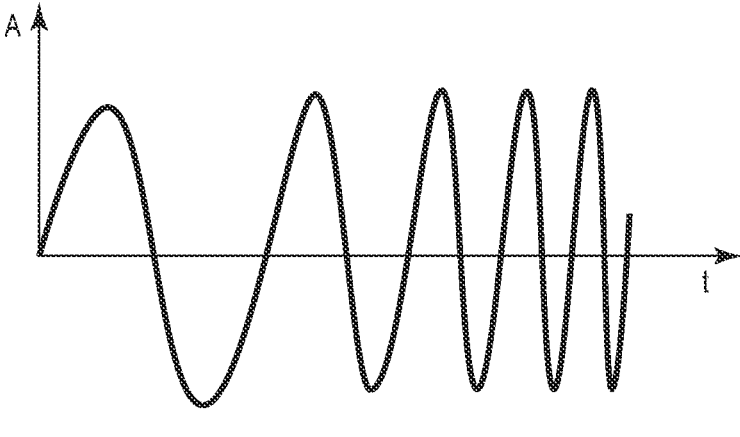
FIG. 6A illustrates an example of a chirp signal.
Figure 6B:
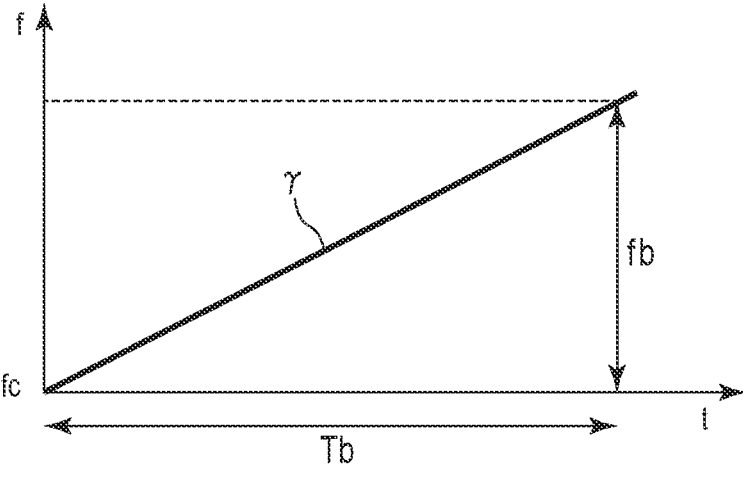
FIG. 6B illustrates another example of the chirp signal.

FIGS. 6A and 6B are diagrams for explaining an example of a chirp signal transmitted from the transmission module 10 according to the first embodiment. FIG. 6A illustrates the chirp signal with an amplitude A expressed as a function of time t. FIG. 6B illustrates the chirp signal with a frequency f expressed as a function of time t. As shown in FIG. 6B, the chirp signal is represented by a center frequency fc, a modulation bandwidth fb, and a signal time width Tb. The slope of the chirp signal is referred to as a frequency change rate (chirp rate) γ.

A transmission signal St(t) of the chirp signal is expressed as Equation 1.

$$St(t)=\cos[2\pi(fc{\times}t+\gamma t^2/2)] \hspace{2cm} \text{Equation 1}$$

The chirp rate γ is represented by Equation 2.

$$\gamma=fb/Tb \hspace{2cm} \text{Equation 2}$$

A reflected wave from an object which is a distance R away from the panel 2 is observed with a delay of Δt=2R/c from transmission timing. Here, c represents the speed of light. A reception signal Sr(t) is represented by Equation 3, where "a" represents the reflection intensity of the object.

$$Sr(t)=a{\times}\cos[2\pi fc(t-\Delta t)+\pi\gamma(t-\Delta t)^2] \hspace{1cm} \text{Equation 3}$$

FIGS. 7A, 7B, and 7C are diagrams for explaining an example of the operation of the radar device according to the first embodiment. FIGS. 7A, 7B, and 7C illustrate the principle of object detection when objects, for example three objects, exist. FIG. 7A illustrates the relationship between a transmission signal and time, and the relationship between reception signals and time. As shown in FIG. 7A, the frequency of the transmission signal changes linearly with time. The reception signal is delayed by Δt with the transmit signal. In case where a plurality of objects exist, a reflected wave from the nearest object indicated by a broken line is received the earliest, and a reflected wave from the farthest object indicated by a one-dot chain line is received the latest.

As shown in FIG. 5, the reception signal is multiplied by the chirp signal by the mixer 26 to obtain an IF signal z(t) in the reception circuit 34. The IF signal z(t) is represented by Equation 4.

$$z(t)=a{\times}\cos(2\pi\Delta t\gamma t) \hspace{2cm} \text{Equation 4}$$

FIG. 7B illustrates a relationship between the frequency of the IF signal and time. In an ideal environment with no noise or the like, the frequency is constant for each reflection wave. The frequency of the IF signal of the reflected wave from the nearest object indicated by a broken line is the lowest. The frequency of the IF signal of the reflected wave from the farthest object indicated by an alternate long and short dashed line is the highest.

The reflection intensity in a frequency domain is calculated by performing a Fourier-transform on the IF signal z(t) of the time domain represented by Equation 4. Accordingly, the amplitude at each point of the frequency domain, which is a result of the Fourier-transform of the IF signal, corresponds to the reflection intensity for each distance from the panel 2. A frequency $f_{if}$ and the distance R have the relationship of Equation 5.

$$f_{if}=\Delta t\gamma=2R\gamma/c \hspace{2cm} \text{Equation 5}$$

FIG. 7C illustrates The relationship between the reflection intensity obtained by performing a Fourier transform on the IF signal of the time domain, and the frequency. In this manner, the reflection intensity for each distance from the panel 2 can be calculated by calculating the amplitudes of a frequency-domain signal of the IF signal.

As the electromagnetic waves used in the embodiment, electromagnetic waves having a wavelength of 1 mm to 30 mm may be used. Electromagnetic waves having a wavelength of 1 mm to 10 mm are referred to as millimeter waves. Electromagnetic waves having a wavelength of 10 mm to 100 mm are referred to as microwaves. Electromagnetic waves having a wavelength of 100 μm to 1 mm, which are referred to as terahertz waves, may be used.

The electromagnetic wave is reflected by the skin of the inspection target 6. The electromagnetic wave is also reflected by metal of a gun, a knife, etc. A reflectance of metal is higher than that of skin. An intensity of a reflected wave of metal is higher than that of a reflected wave of skin. The electromagnetic wave is absorbed by powder such as explosive. The reflectance of powder is lower than that of skin. The intensity of a reflected wave is determined by the kind of substance at a point where an electromagnetic wave is reflected in skin, metal, powder, etc. Therefore, the kind of substance at a point of reflection for each distance can be determined from the intensity of a reflected wave for each distance.

FIG. 8 is a block diagram for explaining an example of the configuration of a radar device 50 according to the first embodiment. The radar device 50 is connected to a host 40. The host 40 transmits a parameter indicating the configuration of the panel 2 in order to control the operation of the radar device 50. Examples of the parameter are a panel parameter, a cluster parameter, and a module parameter.

The panel parameter indicates the arrangement number of the clusters 4 and the total number of clusters 4 on one panel 2. The arrangement number includes the number of clusters 4 in the X direction and the number of clusters 4 in the Y direction. When the clusters 4 are arranged horizontally in one row, the number of clusters in the Y direction is zero. When the clusters 4 are arranged vertically in one column, the number of clusters 4 in the X direction is zero. When the clusters are arranged at a predetermined interval, the clusters are arranged such that the length in the X direction of the clusters 4 are equal to the interval between the clusters 4 in the X direction, and the length in the Y direction of the clusters 4 are equal to the interval between the clusters 4 in the Y direction. Then, received data items from the clusters are synthesized. This enables an inspection target object to be detected by the whole panel 2 with the smallest number of the clusters 4. Thus, in a case of the panel 2 of a fixed size, if the cluster size is small, the number of clusters 4 increases to cover the whole panel 2. As the cluster size increases, the number of clusters 4 decreases. As the cluster size increases, the distance between adjacent clusters 4 increases. At least one cluster 4 selected as the reception cluster is determined according to the cluster size such that only at least one cluster located near a cluster which is currently transmitting receives a reflected wave.

The cluster 4 is defined as a unit of modules which perform radar sensing as shown in FIG. 3. In the cluster 4, each of the transmission antennas 12 transmits in order and all the reception antennas 22 receive a reflected wave simultaneously. On the other hand, in a reception cluster 4 at a position some distance away from a transmitting cluster, a reception signal attenuates because of the viewing-angle characteristic of the antenna and does not contribute to a sensing result. The amount of data processing can be reduced by causing only a cluster or clusters which contribute to the sensing result to output a reception signal.

The cluster parameter indicates how many transmission modules and reception modules constitute a cluster. In the example of FIG. 3, the number of transmission modules is four and the number of reception modules is four. In this case, the number of transmission chirps per cluster is 64 (=4×16).

The module parameter indicates the viewing angle of the transmission antenna 12 and the viewing angle of the reception antenna 22. As an example of the module parameter, 0 indicates a normal viewing angle and 1 indicates a viewing angle narrower than the normal viewing angle. A cluster 4 selected as the reception cluster is also determined on the basis of the viewing angles of the antennas 12 and 22.

The radar device 50 comprises a parameter processor 52, a timing controller 54, transmission controllers 56(1, 1), 56(1, 2), . . . , 56(m−1, n), and 56(m, n), reception controllers 58(1, 1), 58(1, 2), . . . , 58(m−1, n), and 58(m, n), clusters 4(1, 1), 4(1, 2), . . . , 4(m−1, n), and 4(m, n), a signal processor 60, and a display device 62. The transmission controllers 56(1, 1), 56(1, 2), . . . , 56(m−1, n), and 56(m, n) are respectively connected to the transmission modules 10 of each of the clusters 4(1, 1), 4(1, 2), . . . , 4(m−1, n), and 4(m, n). The reception controllers 58(1, 1), 58(1, 2), . . . , 58(m−1, n), and 58(m, n) are respectively connected to the reception modules 20 of each of the clusters 4(1, 1), 4(1, 2), . . . , 4(m−1, n), and 4(m, n).

The parameter processor 52 analyzes the parameter received from the host 40 and calculates the total number of chirp signals (total chirp number) transmitted from the panel 2. That is, the parameter processor 52 calculates the total chirp number (=the number of chirps per cluster×the number of clusters) from the panel parameter (the number of clusters) and the cluster parameter (the number of chirps per cluster). The parameter processor 52 does not necessarily receive the parameter from the host 40, but may acquire a parameter by other means. The reason for analyzing the parameter is to enable the arrangement and configuration of the clusters 4 on the panel 2 to be changed to various types of arrangement and configuration. When the arrangement and configuration of the clusters 4 on the panel 2 are changed, the host transmits the parameter to the radar device 50. When the arrangement and configuration of the clusters 4 are not changed, the parameter processor 52 is unnecessary. The parameter processor 52 transmits a total chirp number signal s1 to the timing controller 54. The timing controller 54 supplies a common transmission timing signal s2 of each chirp to the transmission controllers 56.

The timing controller 54 supplies a common reception timing signal s3 of each chirp to the reception controllers 58. The transmission timing signal s2 indicates a start timing of transmitting a chirp. The transmission timing signal s3 indicates an end timing of transmitting a chirp.

The parameter processor 52 supplies an in-cluster chirp number signal s4 indicating the number of chirps per cluster to the transmission controllers 56 and the reception controllers 58. The transmission controllers 56 and the reception controllers 58 generate information indicating which cluster is transmitting (which is referred to as a cluster counter) by counting the number of chirps.

The parameter processor 52 transmits a reception cluster number signal s5 to the reception controllers 58. The reception cluster number signal s5 is a signal including a reception cluster number. The reception cluster number indicates which cluster is transmitting when a reception module in a cluster is made to output a reception signal.

The radar device 50 operates on the basis of the cluster counter in the following manner. In the case of transmission, clusters 0, 1, 2, . . . , transmit an electromagnetic wave in order. Cluster numbers are allocated in accordance with the arrangement on the panel 2. In the case of reception, each of the reception controllers 58 causes the reception module to output a reception signal when the reception cluster number indicated by the reception cluster number signal s5 transmitted from the parameter processor 52 agrees with the cluster counter. This makes it possible to cause only a cluster near a cluster which is transmitting an electromagnetic wave to output a reception signal.

FIG. 9 is a diagram for explaining an example of the transmission operation of the radar device 50 according to the first embodiment. Initial settings are determined by a control signal from the host 40. The initial settings include an operation of the parameter processor 52 for analyzing a parameter transmitted from the host 40. When a measurement start trigger is transmitted from the host 40 to the timing controller 54 via the parameter processor 52, the timing controller 54 transmits the transmission timing signal s2 to all the transmission controllers 56. The transmission timing signal s2 is successively transmitted in predetermined cycles. At the start of measurement, the value of the cluster counter is 0. When the value of the cluster counter is 0, the transmission controller 56 of the cluster 0 (for example, the cluster 4(1, 1)) causes the cluster 0 to transmit an electromagnetic wave sixty-four times in synchronization with the transmission timing signal s2. The number of times of transmission (sixty-four times) is determined by the cluster parameter. When the value of the cluster counter becomes 1, the transmission controller 56 of the cluster 1 causes the cluster 1 to transmit an electromagnetic wave sixty-four times in synchronization with the transmission timing signal s2. In this manner, electromagnetic waves are transmitted from different clusters in order in accordance with the value of the cluster counter.

Also in the case of reception, when a measurement start trigger is transmitted from the host to the timing controller 54 via the parameter processor 52, the timing controller 54 transmits the reception timing signal s3 to all the reception controllers 58. The reception timing signal s3 is also successively transmitted in predetermined cycles in the same way as the transmission timing signal s2. When the value of the cluster counter is 0 and if 0 is included as the reception cluster number indicated by the reception cluster number signal s5, the reception module of its cluster is made to output a reception signal.

The reception controllers 58 keep the reception modules of the clusters other than at least one cluster 4 from outputting a reception signal. This can reduce the amount of received data and the processing time of the signal processor 60. The reception controllers 58 may, not only keep the reception modules of the clusters other than at least one cluster 4 from outputting a reception signal, but also keep them from performing a reception operation or shut off the power supply. In this case, the effect of reducing power consumption is also brought about.

The signal processor 60 performs signal processing on a reception signal to obtain an inspection result of the item 8. An example of the inspection result is an image showing the item 8. The signal processor 60 causes the display device 62 to display the image. An operator determines what the item 8 is based on the image. Alternatively, the signal processor 60 may determine whether the item 8 is a dangerous item by machine learning. If the item 8 is a dangerous item, the signal processor 60 may inform an operator of the inspection result by causing the display device to display a warning or a speaker to emit an alarm sound.

Three examples of transmission and reception will be described. In these examples, the timing controller 54 selects at least one reception cluster on the basis of the position of the transmission cluster in the panel 2, the panel parameter, the cluster parameter, and the module parameter, whenever a transmission timing signal is transmitted.

FIG. 10 to FIG. 17 are diagrams for explaining a first operation example of the radar device according to the first embodiment. FIG. 10 to FIG. 17 explain the determination of the reception cluster based on the cluster size indicated by the panel parameter. The panel parameter may not indicate the cluster size itself, but may indicate whether the cluster size is larger than a specific size. In the panel 2 shown in FIG. 10 to FIG. 12, the cluster size is smaller than or equal to the specific size. In the panel 2 shown in FIG. 14 to FIG. 17, the cluster size is larger than the specific size.

Figure 12:
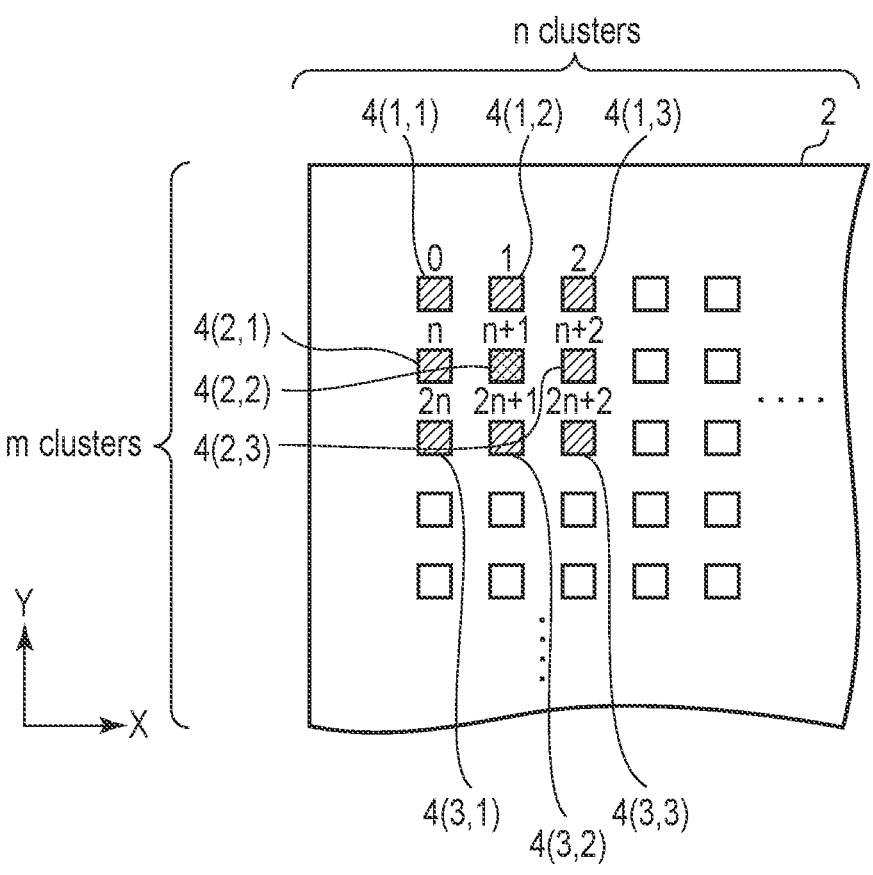
FIG. 12 is a diagram for explaining the first operation example of the radar device according to the first embodiment.

The cluster size of the panel 2 shown in FIG. 10 to FIG. 12 is smaller than the cluster size of the panel 2 shown in FIG. 14 to FIG. 16. When the cluster size is small, the distance between adjacent clusters is short compared to the distance when the cluster size is large. When the interval between the clusters is short, in the transmission cluster and the clusters vertically, horizontally, or diagonally adjacent to the transmission cluster, it is expected that the reception levels of a reflected wave of an electromagnetic wave transmitted from the transmission cluster are higher than or equal to a specific level. When the cluster size is large, the distance between adjacent clusters is long compared to the distance when the cluster size is small. When the interval between the clusters is long, in the transmission cluster and the clusters vertically or horizontally adjacent to the transmission cluster, it is expected that the reception levels of a reflected wave of an electromagnetic wave transmitted from the transmission cluster are higher than or equal to the specific level. It is expected that the reception levels of the clusters diagonally adjacent to the transmission cluster are lower than the specific level.

In other words, when the interval between the clusters is long, it is expected that the proportion of contributions to the signal processing of the signal processor 60 made by the reception signals of the transmission cluster or the clusters vertically or horizontally adjacent to the transmission cluster is greater than or equal to a specific value, whereas the proportion of contributions to the signal processing of the signal processor 60 made by the reception signals of the clusters diagonally adjacent to the transmission cluster is less than the specific value. Thus, even when the clusters diagonally adjacent to the transmission cluster do not output a reception signal and the reception signals of these clusters are excluded from the processing targets of the signal processor 60, the processing result of the signal processor 60 almost does not change. By excluding the reception signals of the clusters diagonally adjacent to the transmission cluster from the processing targets of the signal processor 60, the signal processing time is shortened. Since the clusters diagonally adjacent to the transmission cluster do not output a reception signal, power consumption is also reduced.

FIG. 10 illustrates an example when the transmission cluster is the cluster 4(1, 1) in the first row and the first column. When the cluster size is small or when the interval between the clusters is short, the parameter processor 52 generates the reception cluster number signal s5 such that the transmission cluster 4(1, 1) and the three clusters 4(1, 2), 4(2, 1), and 4(2, 2) located to the right of, below, and to the lower right of the transmission cluster 4(1, 1) are selected as the reception clusters which output a reception signal.

FIG. 11 illustrates an example when the transmission cluster is the cluster 4(1, 2) in the first row and the second column. When the cluster size is small or when the interval between the clusters is short, the parameter processor 52 generates the reception cluster number signal s5 such that the transmission cluster 4(1, 2) and the five clusters 4(1, 1), 4(1, 3), 4(2, 1), 4(2, 2), and 4(2, 3) located to the left of, to the right of, to the lower left of, below, and to the lower right of the transmission cluster 4(1, 2) are selected as the reception clusters which output a reception signal.

FIG. 12 illustrates an example when the transmission cluster is the cluster 4(2, 2) in the second row and the second column. When the cluster size is small or when the interval between the clusters is short, the parameter processor 52 generates the reception cluster number signal s5 such that the transmission cluster 4(2, 2) and the eight clusters 4(1, 1), 4(1, 2), 4(1, 3), 4(2, 1), 4(2, 3), 4(3, 1), 4(3, 2), and 4(3, 3) located to the upper left of, above, to the upper right of, to the left of, to the right of, to the lower left of, below, and to the lower right of the transmission cluster 4(2, 2) are selected as the reception clusters which output a reception signal.

FIG. 13 is a diagram for explaining the selection of a transmission cluster and reception clusters in the first operation example when the cluster size is small or when the interval between the clusters is short. At each value of the cluster counter, an electromagnetic wave is transmitted in order from all the transmission antennas 12 of all the transmission modules 10 of the transmission cluster. At each value of the cluster counter, electromagnetic wave is received by all the reception antennas 22 of all the reception modules 20 of the reception clusters whose reception cluster numbers agree with the cluster counter. The number of reception clusters depends on the position of the transmission cluster and is four, six, or nine.

For example, as shown in FIG. 10, the cluster counter of the transmission cluster 4(1, 1) is 0, the cluster counter of the transmission cluster 4(1, 2) is 1, the cluster counter of the transmission cluster 4(1, 3) is 2, the cluster counter of the transmission cluster 4(2, 1) is n, the cluster counter of the transmission cluster 4(2, 2) is n+1, and the cluster counter of the transmission cluster 4(2, 3) is n+2. At this time, as shown in FIG. 13, the reception cluster 4(1, 1) causes the reception module of the reception cluster to output a reception signal when the cluster counter is 0, 1, n, or n+1. Therefore, the parameter processor 52 transmits, in advance, the reception cluster number signal s5 including reception cluster numbers 0, 1, n, and n+1 to the reception controller of the reception cluster 4(1, 1). Similarly, the parameter processor 52 transmits, in advance, the reception cluster number signal s5 including reception cluster numbers 0, 1, 2, n, n+1, and n+2 to the reception controller of the reception cluster 4(1, 2). The parameter processor 52 transmits, in advance, the reception cluster number signal s5 including reception cluster numbers 0, 1, 2, n, n+1, n+2, 2n, 2n+1, and 2n+2 to the reception controller of the reception cluster 4(2, 2).

FIG. 14 illustrates an example when the transmission cluster is the cluster 4(1, 1). When the cluster size is large or when the interval between the clusters is long, the parameter processor 52 generates the reception cluster number signal s5 such that the transmission cluster 4(1, 1) and the two clusters 4(1, 2) and 4(2, 1) located to the right of and below the transmission cluster 4(1, 1) are selected as the reception clusters which output a reception signal.

FIG. 15 illustrates an example when the transmission cluster is the cluster 4(1, 2). When the cluster size is large or when the interval between the clusters is long, the parameter processor 52 generates the reception cluster number signal s5 such that the transmission cluster 4(1, 2) and the three clusters 4(1, 1), 4(1, 3), and 4(2, 2) located to the left of, to the right of, and below the transmission cluster are selected as the reception clusters which output a reception signal.

FIG. 16 illustrates an example when the transmission cluster is the cluster 4(2, 2). When the cluster size is large or when the interval between the clusters is long, the parameter processor 52 generates the reception cluster number signal s5 such that the transmission cluster 4(2, 2) and the four clusters 4(1, 2), 4(2, 1), 4(2, 3), and 4(3, 2) located above, to the left of, to the right of, and below the transmission cluster are selected as the reception clusters which output a reception signal FIG. 17 is a diagram for explaining the transmission cluster and the reception clusters in the first operation example when the cluster size is large or when the interval between the clusters is long. The number of reception clusters depends on the position of the transmission cluster and is three, four, or five.

When the cluster size is small or the interval between the clusters is short, it is expected that the reception levels of the clusters adjacent to the transmission cluster are higher than or equal to a specific level. Thus, the clusters adjacent to the transmission cluster are made to output a reception signal. The clusters not adjacent to the transmission cluster are made not to output a reception signal. The signal processor 60 does not process the reception signals of all the clusters, but processes the reception signals of the clusters adjacent to the transmission cluster. Thus, the signal processing time can be shortened compared to that when the reception signals of all the clusters are processed, and the signal processing can be completed within a transmission cycle.

When the cluster size is large or when the interval between the clusters is long, it is expected that the reception levels of the clusters diagonally adjacent to the transmission cluster are lower than a specific level and the reception signals of these clusters do not contribute to the signal processing of the signal processor 60. Thus, the clusters diagonally adjacent to the transmission cluster are made not to output a reception signal. Therefore, the sizes of the reception signals transmitted from the clusters 4 to the signal processor 60 are reduced and the signal processing time is shortened, as compared to those when the cluster size is small or when the interval between the clusters is short.

Figure 18:
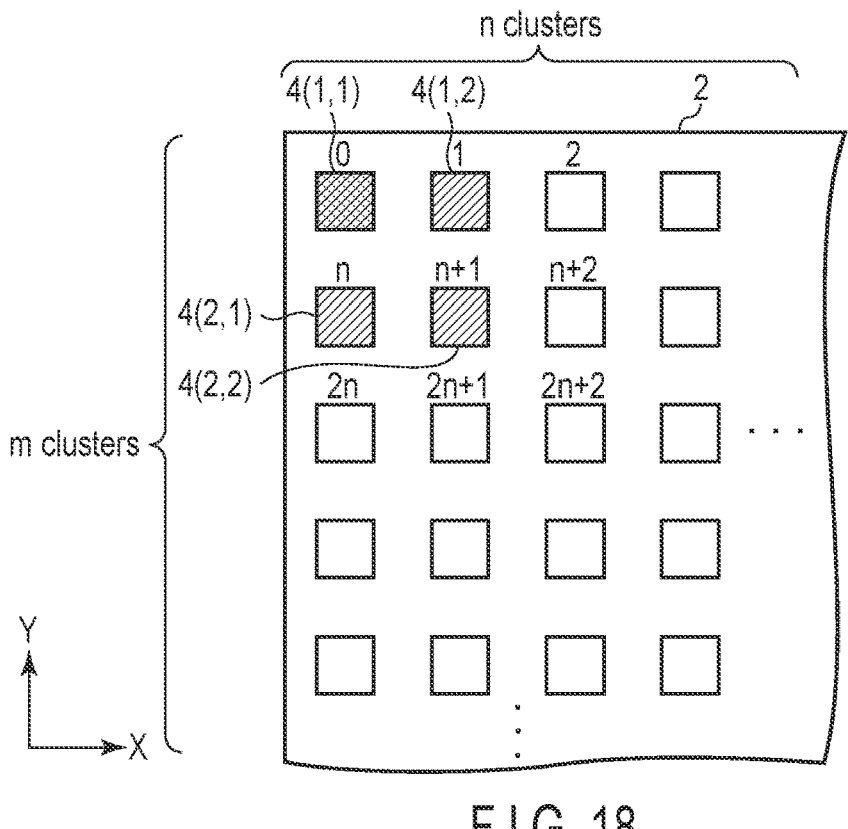
FIG. 18 is a diagram for explaining a second operation example of the radar device according to the first embodiment.
Figure 19:
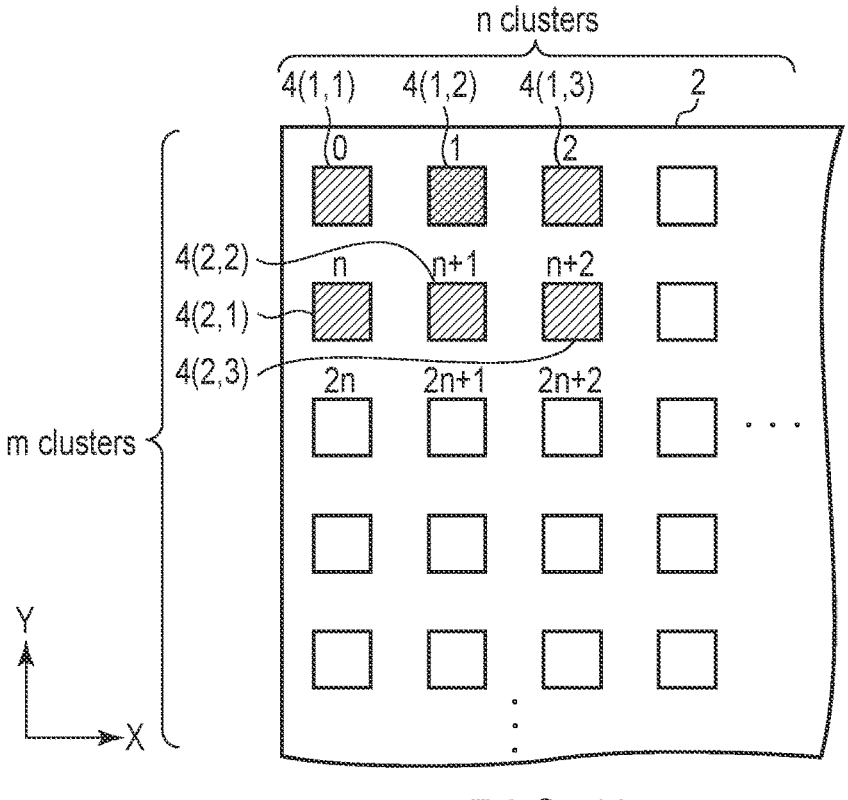
FIG. 19 is a diagram for explaining the second operation example of the radar device according to the first embodiment.
Figure 22:
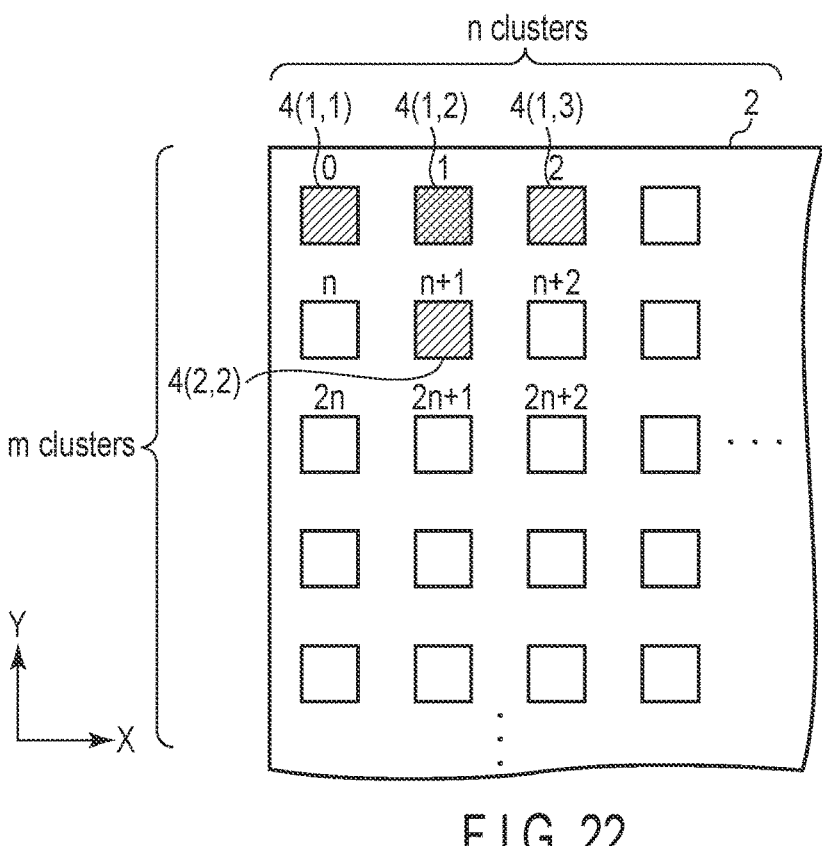
FIG. 22 is a diagram for explaining the second operation example of the radar device according to the first embodiment.
Figure 23:
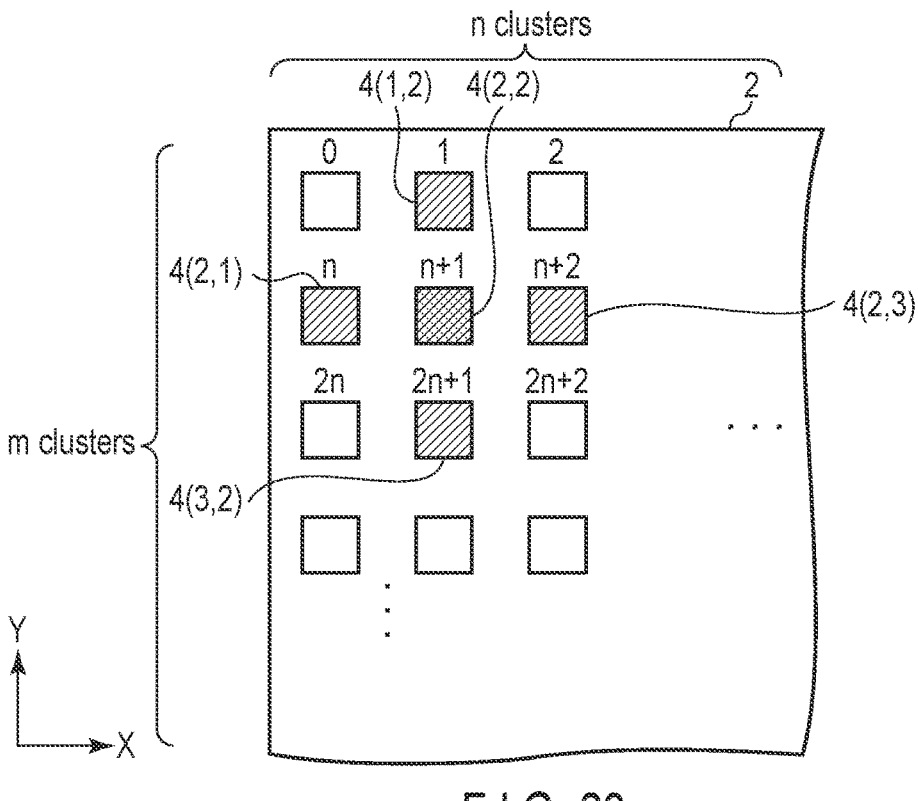
FIG. 23 is a diagram for explaining the second operation example of the radar device according to the first embodiment.

FIG. 18 to FIG. 23 are diagrams for explaining a second operation example of the operation of the radar device according to the first embodiment. FIG. 18 to FIG. 23 illustrate that the reception clusters are determined on the basis of the viewing angles of the antennas 12 and 22 indicated by the module parameter. FIG. 18 to FIG. 20 illustrate the second operation example of the radar device when the module parameter is 0 (normal viewing angle). FIG. 21 to FIG. 23 illustrate the second operation example of the radar device when the module parameter is 1 (viewing angle narrower than the normal viewing angle). The cluster sizes of the panel 2 of FIG. 18 to FIG. 23 are equal to each other. The intervals between the clusters of the panel 2 of FIG. 18 to FIG. 23 are equal to each other.

When the module parameter is 0 (normal viewing angle), in the transmission cluster and the clusters vertically, horizontally, or diagonally adjacent to the transmission cluster, it is expected that the reception levels of a reflected wave of an electromagnetic wave transmitted from the transmission cluster are higher than or equal to the specific level. When the module parameter is 1 (viewing angle narrower than the normal viewing angle), it is expected that the reception levels of the transmission cluster and the clusters vertically or horizontally adjacent to the transmission cluster are higher than or equal to the specific level. When the reception levels of the clusters diagonally adjacent to the transmission cluster are lower than the specific level.

In other words, when the module parameter is 1 (viewing angle narrower than the normal viewing angle), it is expected that the proportion of contributions to the signal processing of the signal processor 60 made by the reception signals of the transmission cluster and the clusters vertically or horizontally adjacent to the transmission cluster is greater than or equal to a specific value. The proportion of contributions to the signal processing of the signal processor 60 made by the clusters diagonally adjacent to the transmission cluster is less than the specific value. Thus, even when the clusters diagonally adjacent to the transmission cluster do not output a reception signal and the reception signals of these clusters are excluded from the processing targets of the signal processor 60, the processing result of the signal processor 60 almost does not change. By excluding the reception signals of the clusters diagonally adjacent to the transmission cluster from the processing targets of the signal processor 60, the signal processing time is shortened. Since the clusters diagonally adjacent to the transmission cluster do not output a reception signal, power consumption is also reduced.

FIG. 18 illustrates an example when the transmission cluster is the cluster 4(1, 1). When the module parameter is 0 (normal viewing angle), the parameter processor 52 generates the reception cluster number signal s5 such that the transmission cluster 4(1, 1) and the three clusters 4(1, 2), 4(2, 1), and 4(2, 2) located to the right of, below, and to the lower right of the transmission cluster are selected as the reception clusters which output a reception signal.

FIG. 19 illustrates an example when the transmission cluster is the cluster 4(1, 2). When the module parameter is 0 (normal viewing angle), the parameter processor 52 generates the reception cluster number signal s5 such that the transmission cluster 4(1, 2) and the five clusters 4(1, 1), 4(1, 3), 4(2, 1), 4(2, 2), and 4(2, 3) located to the left of, to the right of, to the lower left of, below, and to the lower right of the transmission cluster are selected as the reception clusters which output a reception signal.

FIG. 20 illustrates an example when the transmission cluster is the cluster 4(2, 2) in the second row, the second column. When the module parameter is 0 (normal viewing angle), the parameter processor 52 generates the reception cluster number signal s5 such that the transmission cluster 4(2, 2) and the eight clusters 4(1, 1), 4(1, 2), 4(1, 3), 4(2, 1), 4(2, 3), 4(3, 1), 4(3, 2), and 4(3, 3) located to the upper left of, above, to the upper right of, to the left of, to the right of, to the lower left of, below, and to the lower right of the transmission cluster are selected as the reception clusters which output a reception signal.

FIG. 21 illustrates an example when the transmission cluster is the cluster 4(1, 1). When the module parameter is 1 (viewing angle narrower than the normal viewing angle), the parameter processor 52 generates the reception cluster number signal s5 such that the transmission cluster 4(1, 1) and the two clusters 4(1, 2) and 4(2, 1) located to the right of and below the transmission cluster are selected as the reception clusters which output a reception signal.

FIG. 22 illustrates an example when the transmission cluster is the cluster 4(1, 2). When the module parameter is 1 (viewing angle narrower than the normal viewing angle), the parameter processor 52 generates the reception cluster number signal s5 such that the transmission cluster 4(1, 2) and the three clusters 4(1, 1), 4(1, 3), and 4(2, 2) located to the left of, to the right of, and below the transmission cluster are selected as the reception clusters which output a reception signal FIG. 23 illustrates an example when the transmission cluster is the cluster 4(2, 2). When the module parameter is 1 (viewing angle narrower than the normal viewing angle), the parameter processor 52 generates the reception cluster number signal s5 such that the transmission cluster 4(2, 2) and the four clusters 4(1, 2), 4(2, 1), 4(2, 3), and 4(3, 2) located above, to the left of, to the right of, and below the transmission cluster are selected as the reception clusters which output a reception signal.

When the module parameter is 1 (viewing angle narrower than the normal viewing angle), it is expected that the reception levels of the clusters diagonally adjacent to the transmission cluster are lower than a specific level and do not contribute to the signal processing of the signal processor 60. Thus, the clusters diagonally adjacent to the transmission cluster do not output a reception signal. Therefore, the sizes of the reception signals transmitted from the clusters 4 to the signal processor 60 are reduced and the signal processing time is shortened, as compared to those when the module parameter is 0 (normal viewing angle).

Figure 24:
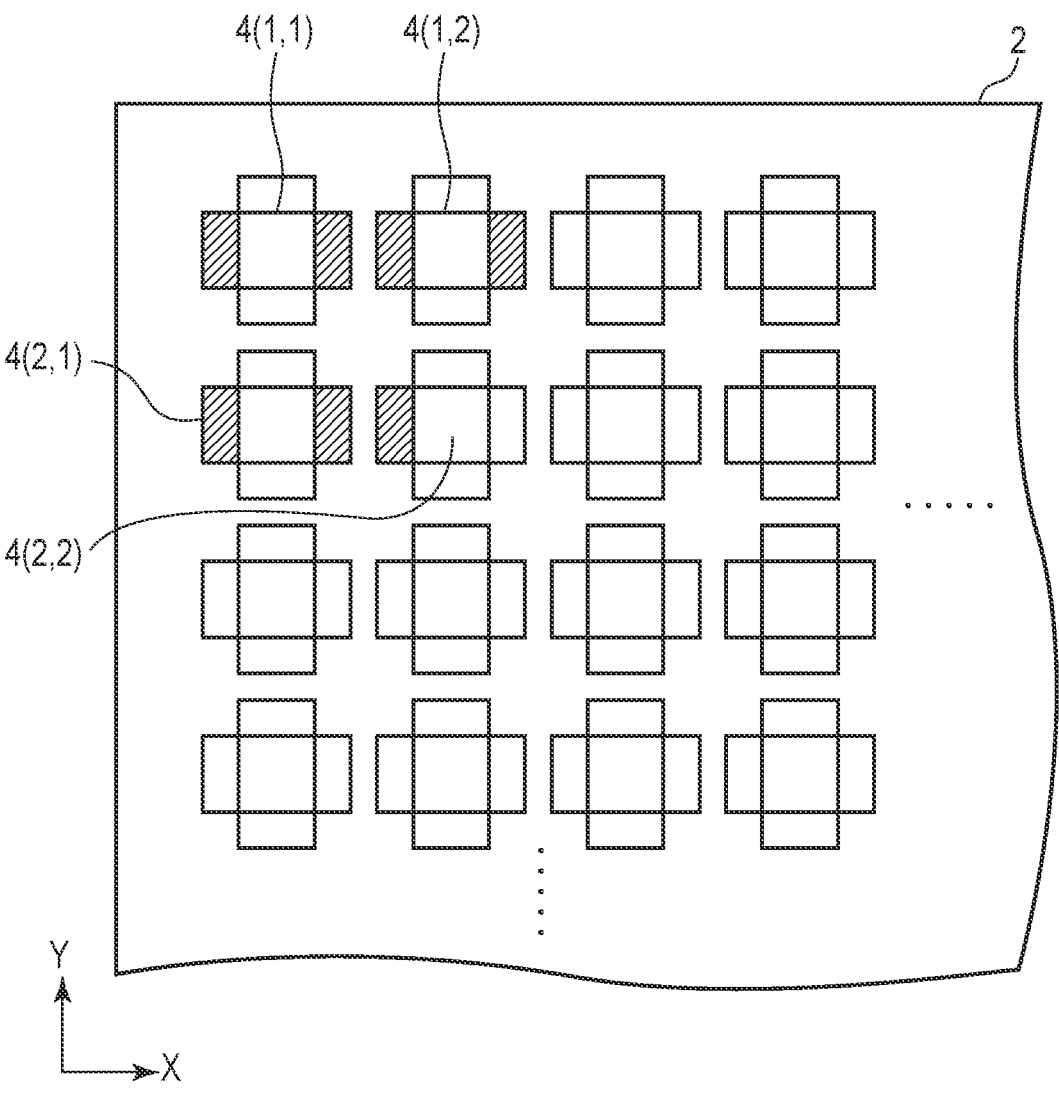
FIG. 24 is a diagram for explaining a third operation example of the radar device according to the first embodiment.
Figure 26:
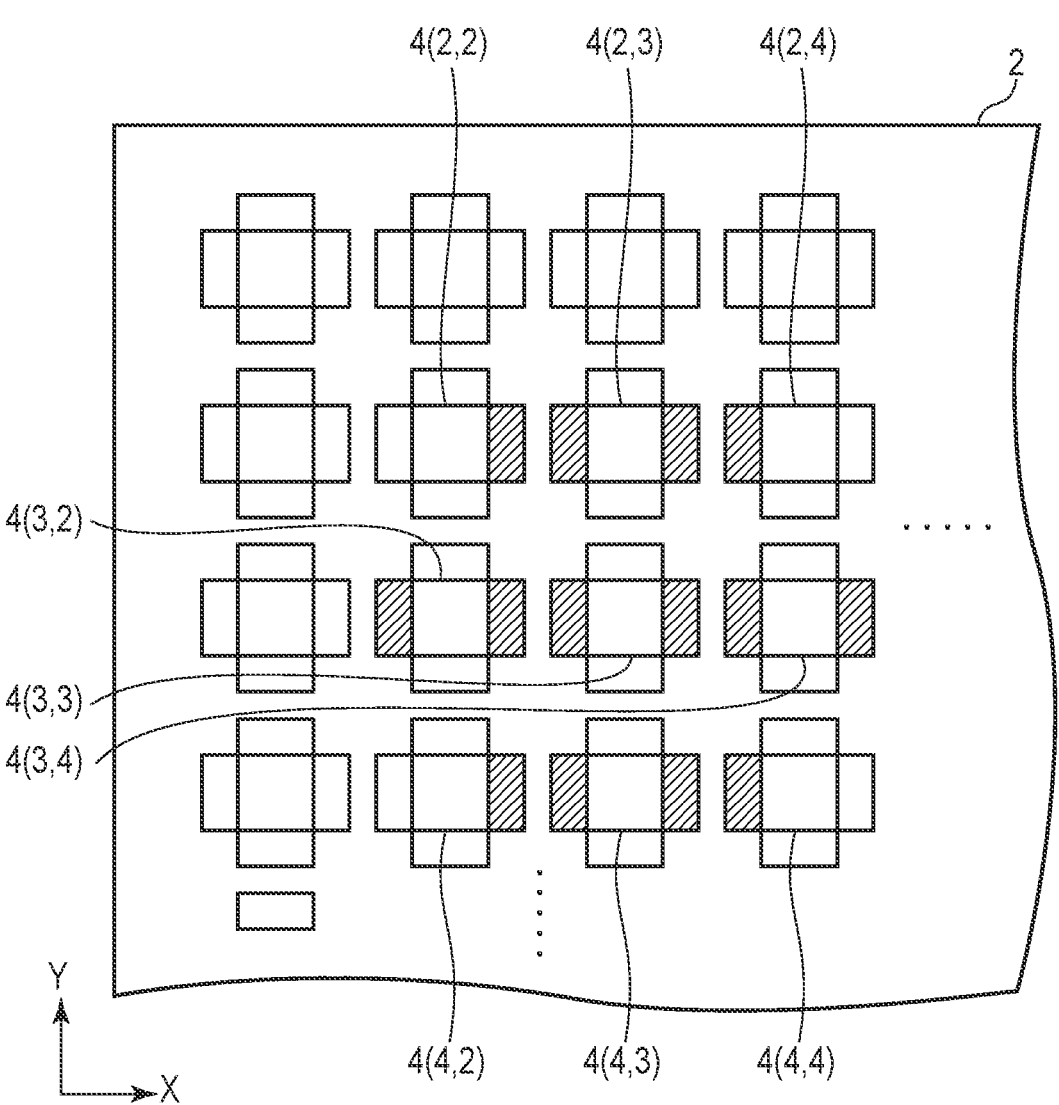
FIG. 26 is a diagram for explaining the third operation example of the radar device according to the first embodiment.

FIG. 24 to FIG. 26 are diagrams for explaining a third operation example of the radar device according to the first embodiment. In the first operation example and the second operation example, all the reception modules 20 (all the reception antennas 22) in the reception clusters receive simultaneously. The reception levels of the reception antennas 22 in the same cluster 4 are different depending on the arrangement of the reception modules 20 (reception antennas 22) in the cluster 4. In some reception antennas 22, the reception levels of a reflected wave may be lower than a specific level. In FIG. 24 to FIG. 26, the transmission modules 10 and the reception modules 20 are arranged as shown in FIG. 3. The reception modules 20 are arranged in two columns extending in the Y direction. In the reception cluster diagonally adjacent to the transmission cluster, it is expected that the reception levels of a reflected wave of the reception antennas of a column farther from the transmission cluster are less than a specific level.

In the third operation example, the parameter processor 52 transmits the reception cluster number signal s5 and a signal indicating reception modules to the reception controllers 58 such that, in the reception cluster diagonally adjacent to the transmission cluster, the reception modules 20 of the column located nearer to the transmission cluster output a reception signal, whereas the reception modules 20 of the column located farther from the transmission cluster do not output a reception signal.

As the signal indicating reception modules, for example, "0" indicates that reception modules on both sides (columns) of a cluster operate, "1" indicates that reception modules located on the left side of the cluster operate, and "2" indicates that reception modules on the right side of the cluster operate.

FIG. 24 illustrates an example when the transmission cluster is the cluster 4(1, 1) in the first row and the first column. The parameter processor 52 transmits the reception cluster number signal s5 indicating the transmission cluster 4(1, 1) and the three clusters 4(1, 2), 4(2, 1), and 4(2, 2) located to the right of, below, and to the lower right of the transmission cluster as the reception clusters which output a reception signal.

Moreover, the parameter processor 52 transmits "0" to the transmission clusters 4(1, 1) and the clusters 4(1, 2), and 4(2, 1), and "1" to the cluster 4(2, 2), as the signal indicating reception modules. In this manner, the clusters 4(1, 1), 4(1, 2), and 4(2, 1) can cause the reception modules 20 on both sides of the clusters to output a reception signal, and the cluster 4(2, 2) can cause the reception modules 20 on the left side, located nearer to the transmission cluster 4(1, 1), to output a reception signal and keep the reception modules 20 on the right side, located farther from the transmission cluster 4 (1, 1), from outputting a reception signal. This can reduce the amount of received data and the processing time of the signal processor 60. The reception modules may be kept from not only outputting a reception signal but also performing a reception operation, or the power supply may be shut off. In this case, the effect of reducing power consumption is also brought about.

FIG. 25 illustrates an example when the transmission cluster is the cluster 4(1, 3) in the first row and the third column. The parameter processor 52 transmits the reception cluster number signal s5 indicating the transmission cluster 4(1, 3) and the five clusters 4(1, 2), 4(1, 4), 4(2, 2), 4(2, 3), and 4(2, 4) located to the left of, to the right of, to the lower left of, below, and to the lower right of the transmission cluster as the reception clusters which output a reception signal.

Moreover, the parameter processor 52 transmits "0" to the transmission cluster 4(1, 3) and the clusters 4(1, 2), 4(1, 4), and 4(2, 3), "1" to the cluster 4(2, 4), and "2" to the cluster 4(2, 2), as the signal indicating reception modules. In this manner, the clusters 4(1, 3), 4(1, 2), 4(1, 4), and 4(2, 3) can cause the reception modules 20 on both sides (columns) of the clusters to output a reception signal. The cluster 4(2, 2) can cause the reception modules 20 on the right side, located nearer to the transmission cluster 4(1, 3), to output a reception signal and keep the reception modules 20 on the left side, located farther from the transmission cluster 4(1, 3), from outputting a reception signal. The cluster 4(2, 4) can cause the reception modules 20 on the left side, located nearer to the transmission cluster 4(1, 3), to output a reception signal and keep the reception modules 20 on the right side, located farther from the transmission cluster 4(1, 3), from outputting a reception signal.

FIG. 26 illustrates an example when the transmission cluster is the cluster 4(3, 3) in the third row and the third column. The parameter processor 52 transmits the reception cluster number signal s5 indicating the transmission cluster 4(3, 3) and the eight clusters 4(2, 2), 4(2, 3), 4(2, 4), 4(3, 2), 4(3, 4), 4(4, 2), 4(4, 3), and 4(4, 4) located to the upper left of, above, to the upper right of, to the left of, to the right of, to the lower left of, below, and to the lower right of the transmission cluster as the reception clusters which output a reception signal.

Moreover, the parameter processor 52 transmits "0" to the transmission cluster 4(3, 3) and the clusters 4(2, 3), 4(3, 2), 4(3, 4), and 4(4, 3), "2" to the clusters 4(2, 2) and 4(4, 2), "1" to the clusters 4(2, 4) and 4(4, 4), and "2" to the clusters 4(2, 2) and 4(4, 2). In this manner, the clusters 4(3, 3), 4(2, 3), 4(3, 2), 4(3, 4), and 4(4, 3) can cause the reception modules 20 on both sides (columns) of the clusters to output a reception signal. The clusters 4(2, 2) and 4(4, 2) can cause the reception modules on the right side, located nearer to the transmission cluster 4(3, 3), to output a reception signal and keep the reception modules on the left side, located farther from the transmission cluster 4(3, 3), from outputting a reception signal. The clusters 4(2, 4) and 4(4, 4) can cause the reception modules 20 on the left side located nearer to the transmission cluster 4(3, 3) to output a reception signal, and keep the reception modules 20 on the right side located farther from the transmission cluster 4(3, 3) from outputting a reception signal. The clusters 4(2, 2) and 4(4, 2) can cause the reception modules 20 on the right side located nearer to the transmission cluster 4(3, 3) to output a reception signal, and keep the reception modules 20 on the left side located farther from the transmission cluster 4(3, 3) from outputting a reception signal.

In the radar device according to the first embodiment, if the panel 2 comprises the clusters 4, when a transmission cluster transmits an electromagnetic wave from all the transmission antennas, a cluster whose level of a reflected wave of the transmitted electromagnetic wave is expected to be higher than or equal to a specific level outputs a reception signal, and a cluster whose level of the reflected wave is expected to be lower than the specific level does not output a reception signal. A reception cluster 4 is determined on the basis of the position of the transmission cluster in the panel 2, the cluster size, the viewing angle of the antenna, or the positions of the reception antennas in the cluster. Accordingly, even if a large number of clusters 4 are provided in accordance with the size of the inspection target 6, the size of a reception signal can be limited and the time required for the signal processing of the reception signal can be shortened. In addition, in the first embodiment, the panels 2 may be disposed at two points in front of and behind the inspection target 6 or four points in front of, behind, to the left of, and to the right of the inspection target 6.

Second Embodiment

FIG. 27 is a diagram for explaining an example of a panel 2A of a radar device according to a second embodiment. The panel 2A comprises clusters, for example, four clusters $4A_1$, $4A_2$, $4A_3$, and $4A_4$. The four clusters $4A_1$ to $4A_4$ are arranged in a one-dimensional array with four rows and one column.

An example of the cluster 4A according to the second embodiment includes two transmission modules and two reception modules which are less than those of the first embodiment.

FIG. 28 is a diagram for explaining an example of the arrangement of panels 2A of the radar device according to the second embodiment. In the second embodiment, four panels $2A_1$, $2A_2$, $2A_3$, and $2A_4$ are disposed at four points around an inspection area, respectively. The four panels $2A_1$ to $2A_4$ are disposed such that the normal lines of the panels point toward a central area of the inspection area. When inspected, an inspection target 112 does not need to stand still. The inspection target 112 can be inspected even when it is walking in the inspection area.

In the first embodiment, if the panel 2 comprises a plurality of the clusters 4, the size of a reception signal is limited by controlling transmission and reception of each of the clusters. In the second embodiment, if the plurality of panels 2A are used, the size of a reception signal is limited by controlling transmission and reception of each of the panels 2A. FIG. 28 illustrates an example of the arrangement of the panels 2A according to the second embodiment. As the panels 2A (four panels 2A in this example), the panels $2A_1$, $2A_2$, $2A_3$, and $2A_4$ are disposed in front of, behind, to the left of, and to the right of the inspection area, respectively. The panels $2A_1$, $2A_2$, $2A_3$, and $2A_4$ each comprise the four clusters $4A_1$ to $4A_4$. While the inspection target 112 is moving in the inspection area, the supply of power to the panels $2A_3$ and $2A_4$ is shut off and power is supplied to the panels $2A_1$ and $2A_2$ to cause the panels $2A_1$ and $2A_2$ to transmit and receive an electromagnetic wave. Thus, the back side of the inspection target 112 is inspected. Then, the power supply to the panels $2A_1$ and $2A_2$ is shut off, and power is supplied to the panels $2A_3$ and $2A_4$ to cause the panels $2A_3$ and $2A_4$ to transmit and receive an electromagnetic wave. Thus, the front side of the inspection target 112 is inspected. While the inspection target 112 is in the inspection area, this operation is repeated to detect the presence or absence of a dangerous object. In the second embodiment, since the number of modules per cluster and the number of clusters are relatively small, the time required to perform sensing once by transmitting and receiving an electromagnetic wave once is sufficiently shorter than the time for the inspection target 112 to pass through the inspection area. Thus, while the inspection target 112 is in the inspection area, the front side and the back side can be sensed repeatedly.

Figure 29:
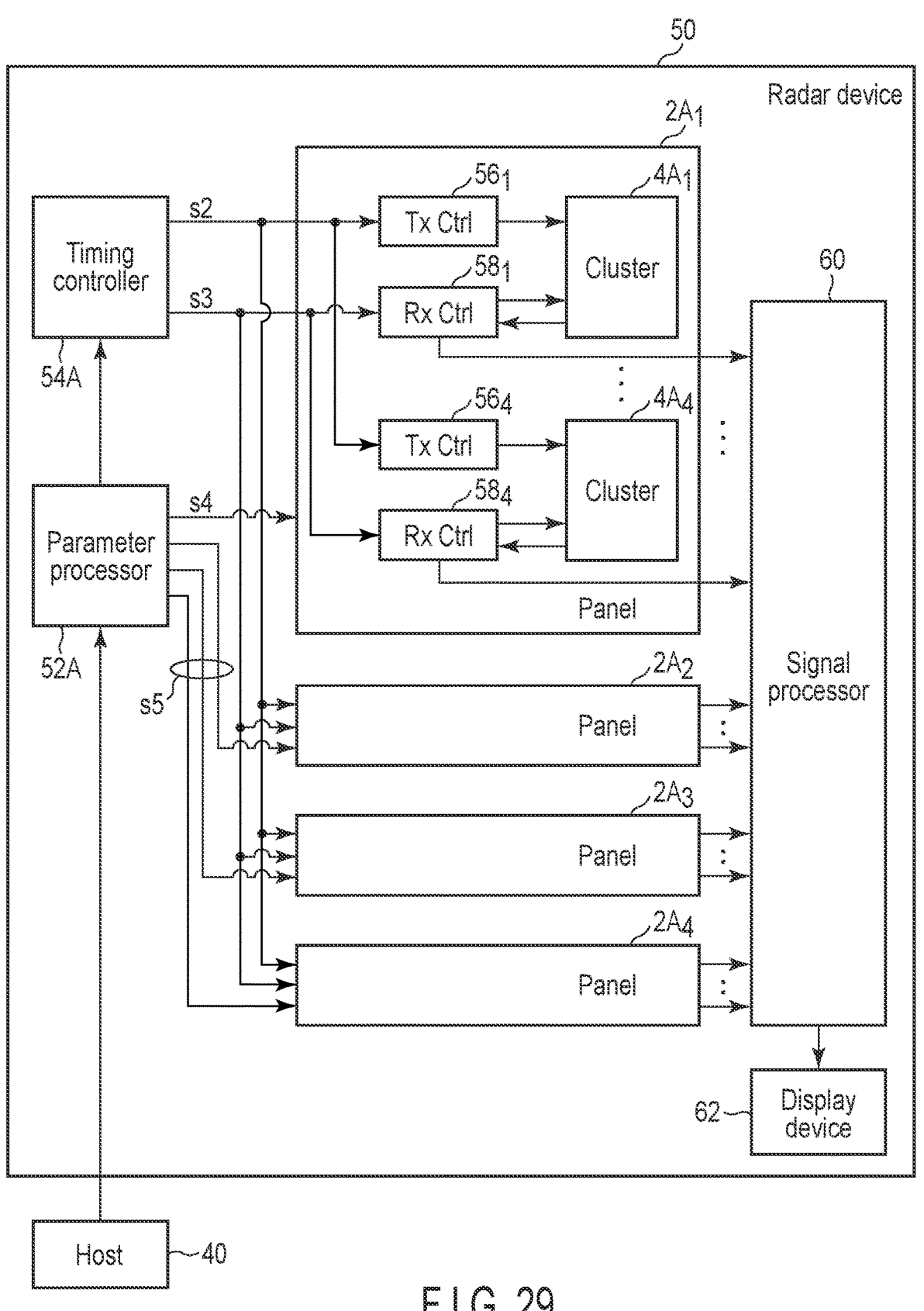
FIG. 29 is a block diagram for explaining an example of the configuration of the radar device according to the second embodiment.

FIG. 29 is a block diagram for explaining an example of the configuration of a radar device according to the second embodiment. The radar device 50 is connected to the host 40. The radar device 50 comprises a parameter processor 52A, a timing controller 54A, the panels $2A_1$ to $2A_4$, the signal processor 60, and the display device 62. The panels 2A each comprise the four clusters $4A_1$ to $4A_4$, four transmission controllers (Tx Ctrls) $56_1$ to $56_4$, and four reception controllers (Rx Ctrls) $58_1$ to $58_4$.

The parameter processor 52A analyzes a parameter received from the host 40 and calculates the total number of chirp signals (total chirp number) transmitted from the panels 2A. The parameter processor 52A transmits the total chirp number signal to the timing controller 54A. The parameter processor 52A and the timing controller 54A operate in the same way as in the first embodiment.

An example of transmission timing and reception timing will be described with reference to FIGS. 30A and 30B.

As in the first embodiment, first, initial settings are determined by a control signal from the host 40. At the time of the initial settings, the parameter processor 52A supplies the in-cluster chirp number signal s4 indicating the number of chirps per cluster to the transmission controllers 56 and the reception controllers 58 of each cluster 4. In addition, the reception cluster number signal s5 determined in accordance with the arrangement of the clusters 4 is transmitted from the parameter processor 52A to the reception controllers 58.

When a measurement start trigger is transmitted from the host 40 to the timing controller 54A via the parameter processor 52A, the timing controller 54A transmits the transmission timing signal s2 to all the transmission controllers 56 and transmits the reception timing signal s3 to all the reception controllers 58.

In the case of transmission, the transmission controllers 56 transmit an electromagnetic wave when a cluster number counted by the cluster counter agrees with cluster numbers allocated to the clusters 4 connected to the transmission controllers 56. Thus, clusters 0, 1, 2, . . . , transmit an electromagnetic wave in order.

In the case of reception, each of the reception controllers 58 causes the reception modules to output a reception signal when a reception cluster number indicated by the reception cluster number signal s5 transmitted from the parameter processor 52A agrees with the cluster counter. In the second embodiment, the reception cluster number signal s5 is set such that the reception clusters of two of the panels $2A_1$ to $2A_4$, whose reception level of an electromagnetic wave from the inspection target 112 is expected to be higher than or equal to a specific level, output a reception signal. The signal processing time can be shortened by outputting a reception signal from the panels whose reception level of an electromagnetic wave reflected by the inspection target 112 is expected to be higher than or equal to the specific level, and not outputting a reception signal from the other panels.

When the value of the cluster counter is 0, the transmission controller $56_1$ of the panel $2A_1$ causes transmission antennas 12 in the cluster $4A_1$ to transmit an electromagnetic wave in order. The parameter processor 52A transmits the reception cluster number signal to all the reception controllers $58_1$ to $58_4$ of the two panels $2A_1$ and $2A_2$ at the time of the initial settings to cause the panels $2A_1$ and $2A_2$ to output a reception signal when the value of the cluster counter is 0.

Thus, when the value of the cluster counter is 0, the reception controllers $58_1$ to $58_4$ of the panels $2A_1$ and $2A_2$ cause all the reception modules 20 to operate and cause all the reception antennas 22 of the panels $2A_1$ and $2A_2$ to receive a reflected wave of an electromagnetic wave transmitted from the cluster $4A_1$ of the panel $2A_1$. Reception signals of the panels $2A_1$ and $2A_2$ are transmitted to the signal processor 60.

When the value of the cluster counter is 1, the transmission controller $56_2$ of the panel $2A_1$ causes all the transmission antennas 12 of the cluster $4A_2$ to transmit an electromagnetic wave in order. In the case of reception, as in the case where the value of the cluster counter is 0, the reception controllers $58_1$ to $58_4$ of the panels $2A_1$ and $2A_2$ cause all the reception modules 20 to operate and cause all the reception antennas 22 of the panels $2A_1$ and $2A_2$ to receive a reflected wave of an electromagnetic wave transmitted from the cluster $4A_2$ of the panel $2A_1$.

Then, similarly, when the value of the cluster counter is 2, a reflected wave of an electromagnetic wave transmitted from the cluster $4A_3$ of the panel $2A_1$ is received by all the reception antennas 22 of the panels $2A_1$ and $2A_2$. When the value of the cluster counter is 3, a reflected wave of an electromagnetic wave transmitted from the cluster $4A_4$ of the panel $2A_1$ is received by all the reception antennas 22 of the panels $2A_1$ and $2A_2$.

When all the transmission antennas 12 of all the clusters 4A of the panel $2A_1$ transmit an electromagnetic wave and then the value of the cluster counter is 4, the transmission cluster $4A_1$ of the panel $2A_2$ transmits an electromagnetic wave. The reception controllers $58_1$ to $58_4$ of the panels $2A_1$ and $2A_2$ cause all the reception modules 20 of the clusters $4A_1$ to $4A_4$ to operate, and cause all the reception antennas 22 of the panels $2A_1$ and $2A_2$ to receive a reflected wave of an electromagnetic wave transmitted from the cluster $4A_1$ of the panel $2A_2$.

Then, similarly, when the value of the cluster counter is 5, a reflected wave of an electromagnetic wave transmitted from the cluster $4A_2$ of the panel $2A_2$ is received by all the reception antennas 22 of the panels $2A_1$ and $2A_2$. When the value of the cluster counter is 6, a reflected wave of an electromagnetic wave transmitted from the cluster $4A_3$ of the panel $2A_2$ is received by all the reception antennas 22 of the panels $2A_1$ and $2A_2$. When the value of the cluster counter is 7, a reflected wave of an electromagnetic wave transmitted from the cluster $4A_4$ of the panel $2A_2$ is received by all the reception antennas 22 of the panels $2A_1$ and $2A_2$.

When the value of the cluster counter is 8 to (FIG. 30B), the transmission panels and the reception panels are different from those when the value of the cluster counter is 0 to 7 (FIG. 30A). When the value of the cluster counter is 0 to 3, the panel $2A_1$ transmits an electromagnetic wave and the panels $2A_1$ and $2A_2$ receive a reflected wave. When the value of the cluster counter is 8 to 11, the panel $2A_3$ transmits an electromagnetic wave and the panels $2A_3$ and $2A_4$ receive a reflected wave. When the value of the cluster counter is 4 to 7, the panel $2A_2$ transmits an electromagnetic wave and the panels $2A_1$ and $2A_2$ receive a reflected wave. When the value of the cluster counter is 12 to 15, the panel $2A_4$ transmits an electromagnetic wave and the panel $2A_3$ and $2A_4$ receive a reflected wave.

In the second embodiment, the panels 2A are disposed to surround the inspection target 112. Thus, a panel whose reception level of an electromagnetic wave reflected by the inspection target 112 is expected to be higher than or equal to a specific level is determined according to the positional relationship between the inspection target 112 and the panels 2A.

In the second embodiment, it has been explained that all the clusters in the reception panel operate as reception clusters. However, as in the first embodiment, the cluster of the reception panel, whose reception strength of a reflected wave of an electromagnetic wave transmitted from the transmission cluster of the transmission panel is expected to be lower than or equal to a specific value on the basis of the configuration of the transmission panel, may be kept from operating. Therefore, the size of a reception signal can be further limited and the signal processing time can be further shortened.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radar device comprising:

a panel including clusters; and a controller, wherein:

the clusters are arranged in a two-dimensional array at an interval;

the controller is configured to:

cause a first cluster of the clusters to transmit an electromagnetic wave to a target, cause the first cluster and at least one second cluster of the clusters to receive a reflected wave of the electromagnetic wave from the target, the at least one second cluster being determined based on the interval such that (i) when the interval is a first interval, the at least one second cluster comprises a vertical cluster vertically adjacent to the first cluster, a horizontal cluster horizontally adjacent to the first cluster, and a diagonal cluster diagonally adjacent to the first cluster, and (ii) when the interval is a second interval longer than the first interval, the at least one second cluster comprises the vertical cluster and the horizontal cluster, cause the first cluster and the at least one second cluster to output reception signals, and cause at least one cluster other than the first cluster and other than the at least one second cluster to not output a reception signal.

2. A radar device comprising:

a panel including clusters; and a controller, wherein:

the clusters are arranged in a two-dimensional array, each of the clusters comprises an antenna having a viewing angle, and the controller is configured to:

cause a first cluster of the clusters to transmit an electromagnetic wave to a target, cause the first cluster and at least one second cluster of the clusters to receive a reflected wave of the electromagnetic wave from the target, the at least one second cluster being determined based on the viewing angle such that (i) when the viewing angle of the clusters is a first viewing angle, the at least one second cluster comprises a vertical cluster vertically adjacent to the first cluster, a horizontal cluster horizontally adjacent to the first cluster, and a diagonal cluster diagonally adjacent to the first cluster, and (ii) when the viewing angle is a second viewing angle narrower than the first viewing angle, the at least one second cluster comprises the vertical cluster and the horizontal cluster, cause the first cluster and the at least one second cluster to output reception signals, and cause at least one cluster other than the first cluster and other than the at least one second cluster to not output a reception signal.

3. A radar device comprising:

a panel including clusters; and a controller, wherein:

the clusters are arranged in a two-dimensional array, each of the clusters comprises a transmission module, a first reception module, and a second reception module, and the controller is configured to:

cause the transmission module of a first cluster of the clusters to transmit an electromagnetic wave to a target, cause the first reception module and the second reception module of the first cluster and the first reception module of a second cluster of the clusters to receive a reflected wave of the electromagnetic wave from the target, the second cluster being diagonally adjacent to the first cluster, and a distance between the first cluster and the first reception module of the second cluster being shorter than a distance between the first cluster and the second reception module of the second cluster, cause the first reception module and the second reception module of the first cluster and the first reception module of the second cluster to output reception signals, and cause the second reception module of the second cluster to not output a reception signal.

4. The radar device of claim 3, wherein:

the clusters include a vertical cluster vertically adjacent to the first cluster and a horizontal cluster horizontally adjacent to the first cluster, and the controller is configured to:

cause the first reception module and the second reception module of the vertical cluster and the first reception module and the second reception module of the horizontal cluster to receive the reflected wave of the electromagnetic wave from the target, and cause the first reception module and the second reception module of the vertical cluster and the first reception module and the second reception module of the horizontal cluster to output reception signals.

\* \* \* \* \*